US012647784B2

(12) United States Patent　　(10) Patent No.:　US 12,647,784 B2
Tate　　(45) **Date of Patent:　*Jun. 2, 2026**

(54) DATA TRANSMISSION METHOD, COMMUNICATION PROCESSING METHOD, DEVICE, AND COMMUNICATION PROCESSING PROGRAM

(71) Applicant: CONNECTFREE CORPORATION, Kyoto (JP)

(72) Inventor: Kristopher Andrew Tate, Kyoto (JP)

(73) Assignee: CONNECTFREE CORPORATION, Kyoto (JP)

(*) Notice: Subject to any disclaimer, the term of this patent is extended or adjusted under 35 U.S.C. 154(b) by 57 days.

This patent is subject to a terminal disclaimer.

(21) Appl. No.: 18/674,561

(22) Filed: May 24, 2024

(65) Prior Publication Data

US 2024/0314563 A1　　Sep. 19, 2024

Related U.S. Application Data

(63) Continuation of application No. 17/427,478, filed as application No. PCT/JP2020/003474 on Jan. 30, 2020, now Pat. No. 12,022,286.

(30) Foreign Application Priority Data

Jan. 31, 2019　(JP) ................................. 2019-015232

(51) Int. Cl.
*H04W 12/069*　　(2021.01)
*H04W 8/26*　　(2009.01)
(Continued)

(52) U.S. Cl.
CPC ........... *H04W 12/069* (2021.01); *H04W 8/26* (2013.01); *H04W 12/041* (2021.01);
(Continued)

(58) Field of Classification Search
CPC ... H04W 12/069; H04W 12/041; H04W 8/26; H04W 40/248; H04W 40/30
See application file for complete search history.

(56) References Cited

U.S. PATENT DOCUMENTS 12,022,286 B2 *　6/2024　Tate ......................... H04W 8/26
2003/0084293 A1 *　5/2003　Arkko ..................... H04L 63/12
713/168

(Continued)

FOREIGN PATENT DOCUMENTS

CN　　101401360 B　　12/2013
JP　　63-155839 A　　6/1988
(Continued)

OTHER PUBLICATIONS

Japanese Office Action received for JP Application No. 2024-14123 on Feb. 19, 2025, 13 pgs.

*Primary Examiner* — Justin Y Lee
(74) *Attorney, Agent, or Firm* — Merchant & Gould P.C.

(57) ABSTRACT

A data transmission method includes: a step in which each of a plurality of devices determines an IP address of each device based on a hash value calculated from a public key of each device according to a hash function; a step in which each of the plurality of devices holds state information reflecting a connection relationship between the devices and transmits a notification message indicating content of the state information to another device; a step in which each of the plurality of devices updates the state information held by each device based on the notification message received from the another device; and a step in which, in a group of devices logically defined based on the state information held by each device, a routing table that is held between the devices included in the group and is used to search for a device to be a destination of data transmission is determined.

16 Claims, 19 Drawing Sheets

(51) Int. Cl.

| | | |
|---|---|---|
| *H04W 12/041* | (2021.01) | |
| *H04W 40/24* | (2009.01) | |
| *H04W 40/30* | (2009.01) | |
| *H04W 84/18* | (2009.01) | |

(52) U.S. Cl.
CPC ......... *H04W 40/248* (2013.01); *H04W 40/30* (2013.01); *H04W 84/18* (2013.01)

(56) References Cited

U.S. PATENT DOCUMENTS

| | | | |
|---|---|---|---|
| 2004/0103213 A1 | 5/2004 | Park | |
| 2006/0056412 A1 | 3/2006 | Page | |
| 2007/0061574 A1 | 3/2007 | Shelest | |
| 2007/0217346 A1* | 9/2007 | Zheng | .................. H04W 40/24 370/408 |
| 2009/0180489 A1* | 7/2009 | Fujita | ..................... H04L 12/66 370/409 |
| 2009/0180493 A1 | 7/2009 | Hirano | |
| 2013/0083701 A1 | 4/2013 | Tomic | |
| 2015/0030013 A1 | 1/2015 | Furukawa | |
| 2015/0372916 A1 | 12/2015 | Haramaty | |

FOREIGN PATENT DOCUMENTS

| | | |
|---|---|---|
| JP | H05-022293 A | 1/1993 |
| JP | 2003-298619 A | 10/2003 |
| JP | 2006-508583 A | 3/2006 |
| JP | 2009171056 A | 7/2009 |
| JP | 2009-529846 A | 8/2009 |
| JP | 2018518867 A | 7/2018 |
| WO | 2004/049634 A1 | 6/2004 |
| WO | 2007/105923 A1 | 9/2007 |
| WO | 2012056430 A1 | 3/2012 |
| WO | 2016172523 A1 | 10/2016 |

* cited by examiner

106(108)

DIGITAL CERTIFICATE —176

PUBLIC KEY —174

PRIVATE KEY —172

VARIOUS APPLICATIONS —300

COMMUNICATION PROCESSING PROGRAM —170

| VALUE (HEXADECIMAL NOTATION) | DEVICE TYPE |
|---|---|
| 00 | PERSONAL COMPUTER (PC) |
| 01 | SMARTPHONE, TABLET, WEARABLE DEVICE |
| 02 | INFORMATION APPLIANCES |
| 03 | VEHICLE |
| 04 | INSTRUMENT |

| | IP ADDRESS | Room No. | EXPIRATION DATE |
|---|---|---|---|
| (a) | fc03:0:0:0:2ba:ff:fe9a:4ca2 | 2001 | 180801:15:00~180802:10:00 |
| | fc03:0:0:0:2ba:ff:28ca:8a00 | 2002 | 180801:15:00~180804:10:00 |
| | fc03:0:0:0:2ba:ff:a8b2:4052 | 2003 | 180802:15:00~180804:10:00 |
| | ⋮ | ⋮ | ⋮ |

Figure 19:
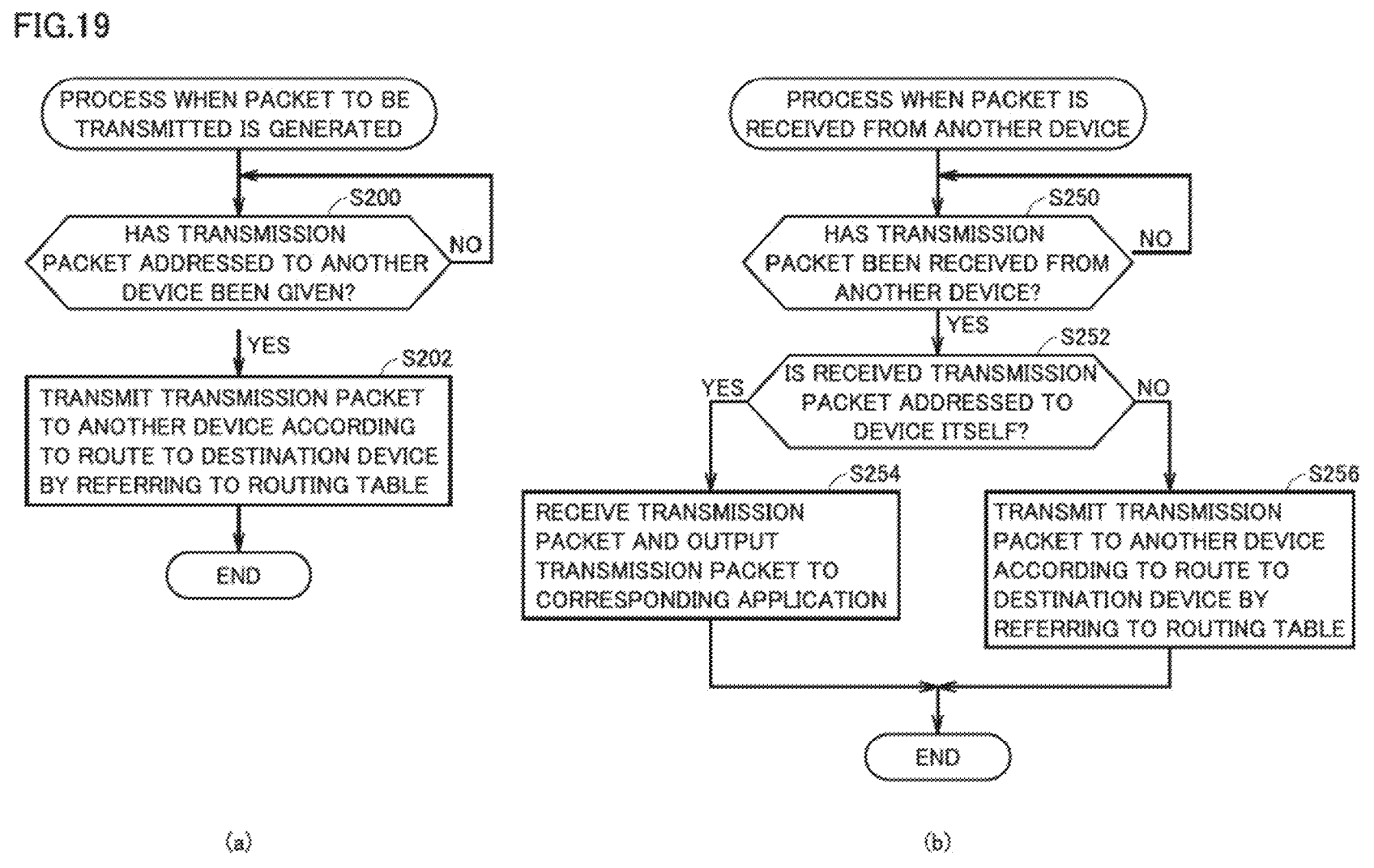

PROCESS WHEN PACKET TO BE TRANSMITTED IS GENERATED

S200 — HAS TRANSMISSION PACKET ADDRESSED TO ANOTHER DEVICE BEEN GIVEN?

NO

YES

S202 — TRANSMIT TRANSMISSION PACKET TO ANOTHER DEVICE ACCORDING TO ROUTE TO DESTINATION DEVICE BY REFERRING TO ROUTING TABLE

END (b)

PROCESS WHEN PACKET IS RECEIVED FROM ANOTHER DEVICE

S250 — HAS TRANSMISSION PACKET BEEN RECEIVED FROM ANOTHER DEVICE?

NO

YES

S252 — IS RECEIVED TRANSMISSION PACKET ADDRESSED TO DEVICE ITSELF?

YES

NO

S254 — RECEIVE TRANSMISSION PACKET AND OUTPUT TRANSMISSION PACKET TO CORRESPONDING APPLICATION

S256 — TRANSMIT TRANSMISSION PACKET TO ANOTHER DEVICE ACCORDING TO ROUTE TO DESTINATION DEVICE BY REFERRING TO ROUTING TABLE

END

DATA TRANSMISSION METHOD, COMMUNICATION PROCESSING METHOD, DEVICE, AND COMMUNICATION PROCESSING PROGRAM

CROSS-REFERENCE TO RELATED APPLICATIONS

This application is a Continuation of U.S. application Ser. No. 17/427,478 on Jul. 30, 2021, which is a National Stage of PCT/JP2020/003474, filed Jan. 31, 2020, which claims benefit of Japanese Patent Application No. 2019-015232, filed Jan. 31, 2019 which applications are incorporated herein by reference. To the extent appropriate, a claim of priority is made to each of the above-disclosed applications.

TECHNICAL FIELD

The present disclosure relates to data communication technology between devices having authenticated IP addresses.

BACKGROUND ART

The development of information and communication technology (ICT) has been remarkable in recent years, and devices connected to a network such as the Internet are not limited to conventional information processing devices, such as personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

Usually, on a network, data communication between devices is realized by using an IP (Internet Protocol) address statically or dynamically assigned to each device.

In order to realize data communication between devices, data transmitted from the transmission source device should be transmitted to the destination device. Such data transmission processing is referred to as "routing" or the like. In order to realize such routing, a large number of routers are arranged on the network.

As disclosed in JP H05-022293 A (Patent Document 1), a router has a route information table for storing route information, and determines a route and relays a received frame according to the internetworking address in the received frame and the content of the route information table.

CITATION LIST

Patent Document 1: JP H05-022293 A

SUMMARY OF THE INVENTION

According to the above Patent Document 1, assuming that there is a network in which a large number of devices are present, a large number of routers are required, and the responsibility of each router is large. For this reason, in a network in which a large number of devices are present, it is preferable that each device can independently realize data communication. The present disclosure provides a solution for realizing such a configuration.

Means for Solving Problem

According to an aspect of the present disclosure, a data transmission method in a network to which a plurality of devices are connected is provided. The data communication method includes: a step in which each of the plurality of devices determines an IP address of each device based on a hash value calculated from a public key of each device according to a hash function; a step in which each of the plurality of devices holds state information reflecting a connection relationship between the devices and transmits a notification message indicating content of the state information to another device; a step in which each of the plurality of devices updates the state information held by each device based on the notification message received from the another device; and a step in which, in a group of devices logically defined based on the state information held by each device, a routing table that is held between the devices included in the group and is used to search for a device to be a destination of data transmission is determined.

The notification message may include identification information for identifying each device, the identification information being calculated based on the IP address determined by each device.

The data transmission method may further include: a step in which each of the plurality of devices transmits a public key of each device and a digital certificate associated with the public key to another device; and a step in which the device that receives the public key and the digital certificate determines an IP address of a transmission source device of the public key and the digital certificate based on a hash value calculated from the public key according to a hash function.

The determined IP address may include a predetermined eigenvalue for identification.

The determined IP address may include a value according to a device type for which the IP address is determined.

According to another aspect of the present disclosure, a communication processing method in a device connected to a network is provided. The communication processing method includes: a step of determining an IP address of the device itself based on a hash value calculated from a public key according to a hash function; a step of holding state information reflecting a connection relationship with another device and transmitting a notification message indicating content of the state information to the another device; a step of updating the state information based on the notification message received from the another device; and a step of holding a routing table used to search for a device to be a destination of data transmission in a group of devices logically defined based on the state information held by each device.

The notification message may include identification information for identifying the device itself, the identification information being calculated based on the determined IP address of the device itself.

The communication processing method may further include a step of determining the routing table when it is determined that the device itself operates as a root node in the group based on the state information.

The step of holding the routing table may include a step of receiving the routing table from another device.

The state information and the notification message may include identification information for identifying a device serving as a root node. The updating step may include a step in which, when a device serving as a root node included in the received notification message does not match a device serving as a root node included in the state information, one of the devices is determined as a root node according to a predetermined rule.

The communication processing method may further include: a step of acquiring a digital certificate associated with the public key from a certificate authority; and a step of transmitting the public key and the digital certificate to another device.

The communication processing method may further include: a step in which, when the public key and a digital certificate associated with the public key are received from the another device, validity of the digital certificate is determined; and a step in which, when it is determined that the digital certificate is valid, an IP address of the another device is determined based on a hash value calculated from the public key according to a hash function.

The determined IP address may include a predetermined eigenvalue for identification.

The determined IP address may include a value according to a device type for which the IP address is determined.

According to another aspect of the present disclosure, a communication processing method in a device connected to a network is provided. The communication processing method includes: a step of receiving a public key of another device and a digital certificate associated with the public key; a step of determining validity of the digital certificate; a step in which, when it is determined that the digital certificate is valid, an IP address determined based on a hash value calculated from the public key according to a hash function is determined as an authenticated IP address of the another device; and a step of providing a service according to the authenticated IP address of the another device in response to a request from the another device.

The public key may be determined so that the IP address determined based on the hash value calculated from the public key according to the hash function conforms to a predetermined format.

A device according to still another aspect of the present disclosure includes: a network interface for connecting to a network; and a control unit connected to the network interface. The control unit executes: processing for determining an IP address of the device itself based on a hash value calculated from a public key according to a hash function; processing for holding state information reflecting a connection relationship with another device and transmitting a notification message indicating content of the state information to the another device; processing for updating the state information based on the notification message received from the another device; and processing for holding a routing table used to search for a device to be a destination of data transmission in a group of devices logically defined based on the state information held by each device.

According to still another aspect of the present disclosure, a communication processing program for a computer having a network interface for connecting to a network is provided. When the communication processing program is executed by the computer, the communication processing program causes the computer to execute the communication processing method described above.

Effect of the Invention

According to the present disclosure, it is possible to provide a configuration in which each device can independently realize data communication in a network in which a large number of devices are present.

BRIEF DESCRIPTION OF DRAWINGS

FIG. 5 is a diagram showing an example of type identification information embedded in the IP address used in the network system according to the present embodiment;

FIG. 19 is a flowchart showing a processing procedure relevant to packet transmission and reception of each device in the network system according to the present embodiment.

MODE(S) FOR CARRYING OUT THE INVENTION

Figure 1:
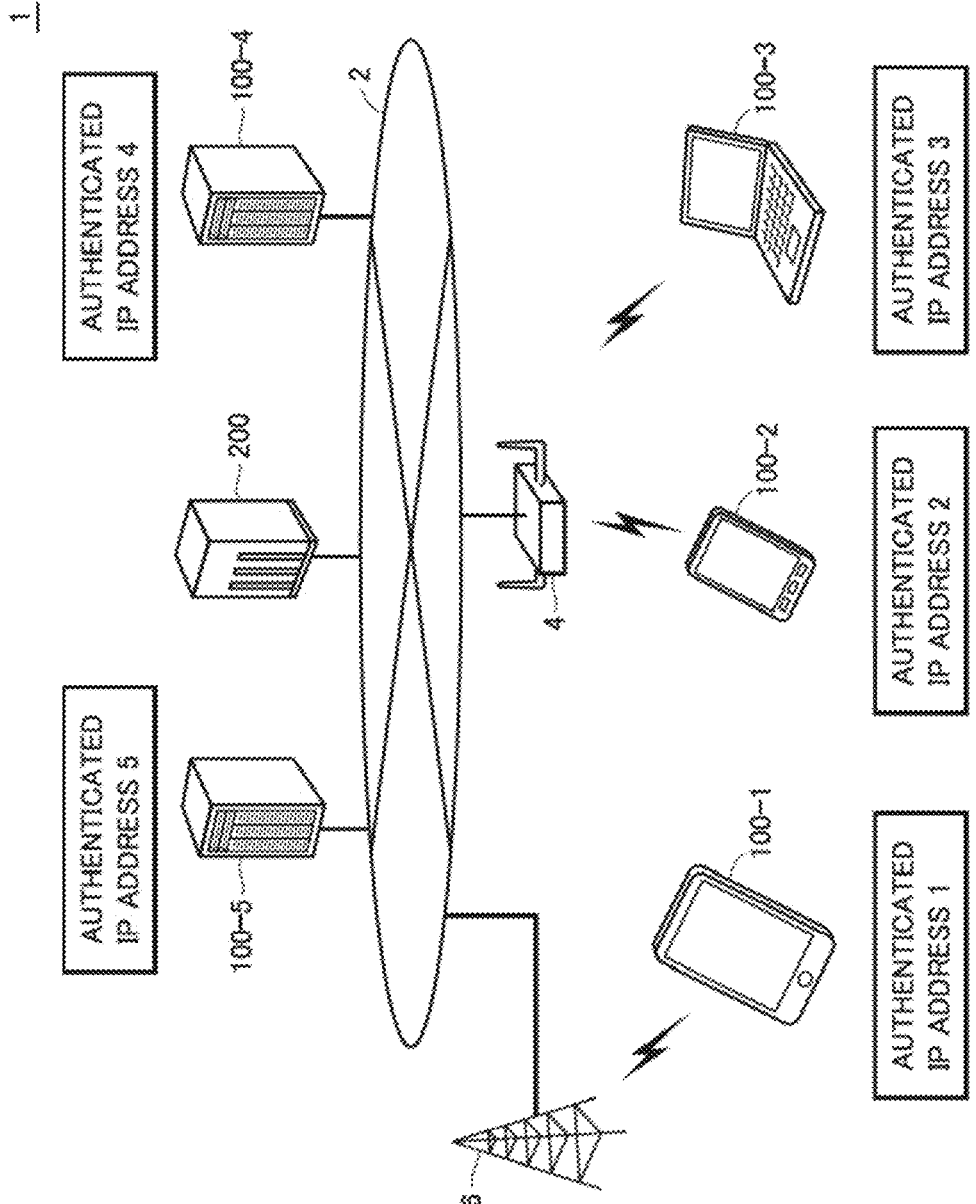
FIG. 1 is a schematic diagram showing an example of the overall configuration of a network system according to the present embodiment.

Hereinafter, an embodiment according to the present disclosure will be described in detail with reference to the diagrams. In addition, the same or corresponding portions in the diagrams are denoted by the same reference numerals, and the description thereof will not be repeated.

A. Overall Configuration of Network System 1

First, the overall configuration of the network system 1 according to the present embodiment will be described.

FIG. 1 is a schematic diagram showing an example of the overall configuration of the network system 1 according to the present embodiment. Referring to FIG. 1, it is assumed that a plurality of devices 100-1, 100-2, and 100-3, 100-4, 100-5, . . . (hereinafter, may be referred to collectively as a "device 100") are connected to an arbitrary network 2 such as the Internet or an intranet. Some of the devices 100 may be connected to the network 2 through wireless communication established between the devices 100 and an access point 4. Alternatively, some other devices 100 may be connected to the network 2 through wireless communication established between the devices 100 and a mobile base station 6.

Thus, the network 2 may include any one of a local area network (LAN), a wide area network (WAN), a radio access network (RAN), and the Internet.

Each of the devices 100 connected to the network can be regarded as a "node" of the network, and in the following description, the device 100 may be referred to as a "node".

In the network system 1 according to the present embodiment, data communication is realized between the devices 100 according to a procedure described later. In addition, any physical connection method between the devices 100 may be used.

The device 100 includes any device having a function of performing data communication with other devices using the IP address of each device. The device 100 may be configured as a single communication device, may be configured as a part of any thing, or may be configured to be embedded in any thing.

More specifically, the device 100 may be, for example, a personal computer, a smartphone, a tablet, or a wearable device (for example, a smart watch or an AR glass) worn on the user's body (for example, an arm or a head). In addition, the device 100 may be a control device installed in a smart home appliance, a connected automobile, a factory, and the like or a part thereof.

The network system 1 according to the present embodiment further includes one or more certificate authorities 200. Each of the certificate authorities 200 is a computer configured by one or more servers. The IP address of each device 100 is authenticated according to a procedure, which will be described later, by using one or more certificate authorities 200. As a result, each device 100 has an authenticated IP address.

In this specification, the "authenticated IP address" means a state in which the validity of the IP address held by each device 100 is guaranteed for the communication destination or a third party. More specifically, the "authenticated IP address" means an IP address that is generated by an irreversible cryptographic hash function and is directly or indirectly authenticated by the certificate authority (details thereof will be described later). By using such an "authenticated IP address", it can be guaranteed that the IP address used by each device 100 for data communication is not spoofed.

As a result, any device 100 included in the network system 1 is uniquely identified based on the IP address of each device 100. That is, each device can determine a device to be a destination or a transmission destination of data transmission based on the IP address of each device.

The IP address is assumed to be a global IP address that can also be used for data communication between the devices 100 connected to the Internet, but may be a private IP address that is used only in a specific network.

The number of bits that make up an IP address differs depending on the version. In the currently established IPv4 (Internet Protocol Version 4), a 32-bit address section is defined, and in the currently established IPv6 (Internet Protocol Version 6), a 128-bit address section is defined. In the present embodiment, an IP address according to IPv6 will be mainly described. However, the present disclosure can also be applied to a network address specified by a larger number of bits or a network address specified by a smaller number of bits.

B. Configuration Example of Device 100

Next, a configuration example of the hardware and software of the device 100 used in the network system 1 according to the present embodiment will be described.

Figure 2:
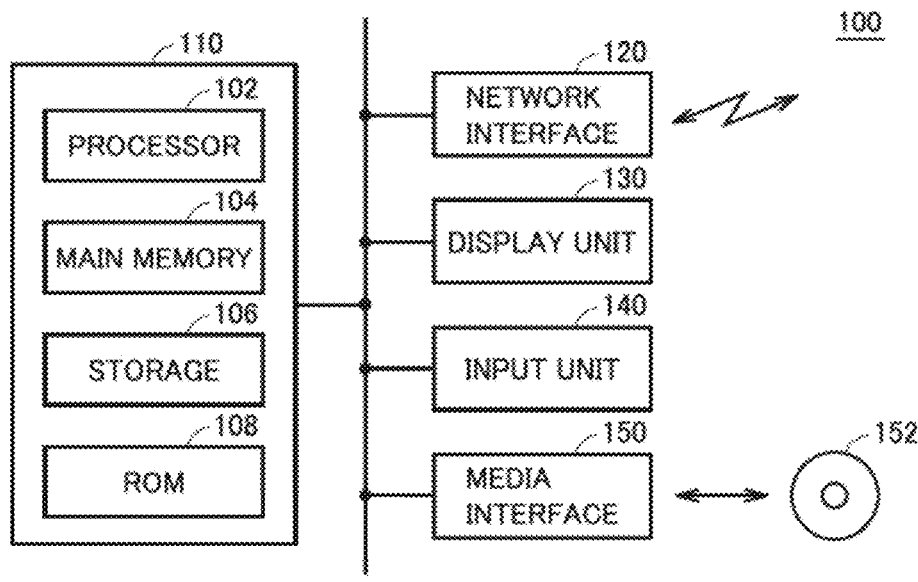
FIG. 2 is a schematic diagram showing a hardware configuration example of a device according to the present embodiment.

FIG. 2 is a schematic diagram showing a hardware configuration example of the device 100 according to the present embodiment. Referring to FIG. 2, the device 100 includes a control unit 110, which is a processing circuitry, as a main component.

The control unit 110 is a calculation subject for providing functions and executing processes according to the present embodiment. The control unit 110 may be configured such that, by using a processor and a memory shown in FIG. 2, the processor executes computer-readable instructions (an OS (Operating System) and a communication processing program shown in FIG. 3) stored in the memory. Alternatively, the control unit 110 may be realized by using a hard-wired circuit such as an ASIC (Application Specific Integrated Circuit) in which a circuit corresponding to computer-readable instructions is provided. In addition, the control unit 110 may be realized by realizing a circuit corresponding to computer-readable instructions on an FPGA (field-programmable gate array). In addition, the control unit 110 may be realized by appropriately combining a processor, a memory, an ASIC, an FPGA, and the like.

In a configuration using the processor and the memory shown in FIG. 2, the control unit 110 includes a processor 102, a main memory 104, a storage 106, and a ROM (Read Only Memory) 108.

The processor 102 is an arithmetic circuit that sequentially reads and executes computer-readable instructions. The processor 102 includes, for example, a CPU (Central Processing Unit), an MPU (Micro Processing Unit), and a GPU (Graphics Processing Unit). The control unit 110 may be realized by using a plurality of processors 102 (multi-processor configuration), or the control unit 110 may be realized by using a processor having a plurality of cores (multicore configuration).

The main memory 104 is a volatile storage device, such as a DRAM (Dynamic Random Access Memory) or a SRAM (Static Random Access Memory). The processor 102 loads a designated program, among various programs stored in the storage 106 or the ROM 108, into the main memory 104 and cooperates with the main memory 104 to realize various processes according to the present embodiment.

The storage 106 is, for example, a non-volatile storage device, such as an HDD (Hard Disk Drive), an SSD (Solid State Drive), or a flash memory. The storage 106 stores various programs executed by the processor 102 or various kinds of data described later.

The ROM 108 fixedly stores various programs executed by the processor 102 or various kinds of data described later.

In the configuration shown in FIG. 2 in which the processor 102 executes computer-readable instructions stored in the memory, the memory corresponds to the storage 106 and the ROM 108.

Here, an example of a program and data stored in the memory of the device 100 will be described.

Figure 3:
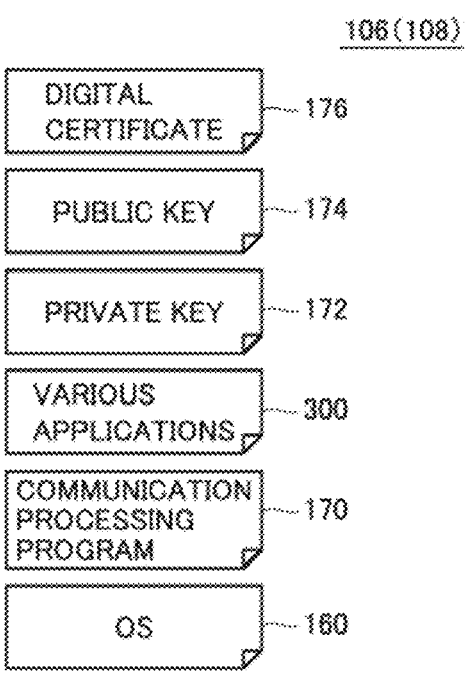
FIG. 3 is a schematic diagram showing a configuration example of a program and data of a device according to the present embodiment.

FIG. 3 is a schematic diagram showing a configuration example of a program and data of the device 100 according to the present embodiment. Referring to FIG. 3, in the memory (the storage 106 and/or the ROM 108) of the device 100, for example, an OS 160, a communication processing program 170, and various applications 300 are stored as programs including computer-readable instructions.

The OS 160 is a program that provides basic functions for realizing the processing executed by the device 100. The communication processing program 170 is mainly a program for providing the functions and executing the processes according to the present embodiment. In addition, the communication processing program 170 may provide the functions and execute the processes according to the present embodiment by using a library or the like provided by the OS 160.

The various applications 300 are programs for realizing various functions provided by the device 100, and can be arbitrarily installed by the user. Typically, the various applications 300 provide various processes using a data communication function provided by the communication processing program 170.

In addition, in the memory (the storage 106 and/or the ROM 108) of the device 100, for example, a private key 172, a public key 174, and a digital certificate 176 are stored as data necessary for providing the functions and executing the processes according to the present embodiment. The private key 172 and the public key 174 are a so-called key pair generated according to an arbitrary encryption/decryption algorithm. The private key 172 is used for encrypted communication with other devices. The public key 174 is used to determine the IP address of each device 100 according to a procedure described later. The digital certificate 176 is issued to the public key 174 by the certificate authority 200, and is for ensuring the validity of the IP address of the device 100. Usually, the digital certificate 176 includes a hash value (digital signature) calculated from the public key 174 of each device 100 using the private key of the certificate authority 200. The device 100 that has received the digital certificate 176 checks the validity of the digital certificate 176 and the public key 174 associated with the digital certificate 176 by using the public key of the certificate authority 200.

The generation of a key pair (the private key 172 and the public key 174), the acquisition of the digital certificate 176, the procedure for using these pieces of data, and the like will be described later.

In addition, it is not necessary to provide both the storage 106 and the ROM 108, and only one of the storage 106 and the ROM 108 may be provided depending on the mounting type. In addition, when both the storage 106 and the ROM 108 are provided, for example, the key pair (the private key 172 and the public key 174) may be stored in the ROM 108 to enhance the confidentiality.

Referring back to FIG. 2, the device 100 further includes a network interface 120 for connecting the device 100 to the network. The network interface 120 performs data communication with other devices through the network.

Examples of the network interface 120 include wired connection terminals, such as serial ports including an Ethernet (registered trademark) port, a USB (Universal Serial Bus) port, and an IEEE1394 and a legacy parallel port. Alternatively, the network interface 120 may include processing circuitries and antennas for wireless communication with devices, routers, mobile base stations, and the like. The wireless communication supported by the network interface 120 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

The device 100 may include a display unit 130, an input unit 140, and a media interface 150 as optional components.

The display unit 130 is a component for presenting the processing result of the processor 102 to the outside. The display unit 130 may be, for example, an LCD (Liquid Crystal Display) or an organic EL (Electro-Luminescence) display. In addition, the display unit 130 may be a head-mounted display mounted on the user's head, or may be a projector that projects an image on the screen.

The input unit 140 is a component for receiving an input operation of a user who operates the device 100. The input unit 140 may be, for example, a keyboard, a mouse, a touch panel arranged on the display unit 130, or an operation button arranged in the housing of the device 100.

The media interface 150 reads various programs and/or various kinds of data from a non-transitory media 152 in which various programs (computer-readable instructions) and/or various kinds of data are stored.

The media 152 may be, for example, an optical medium, such as a DVD (Digital Versatile Disc), or a semiconductor medium, such as a USB memory. The media interface 150 adopts a configuration according to the type of the media 152. Various programs and/or various kinds of data read by the media interface 150 may be stored in the storage 106 or the like.

In addition, instead of installing various programs and/or various kinds of data on the device 100 through the media 152, necessary programs and data may be installed on the device 100 from a distribution server on the network. In this case, the necessary programs and data are acquired through the network interface 120.

As described above, since the display unit 130, the input unit 140, and the media interface 150 are optional components, the display unit 130, the input unit 140, and the media interface 150 may be connected from the outside of the device 100 through any interface such as a USB.

Providing the functions and executing the processes according to the present embodiment are realized by the control unit 110, and the technical scope of this application includes at least the hardware and/or the software for realizing the control unit 110. As described above, for the hardware, not only a configuration including a processor and a memory but also a configuration using a hard-wired circuit using an ASIC or the like or a configuration using an FPGA can be included. That is, the control unit 110 can be realized by installing a program on a general-purpose computer, or can be realized as a dedicated chip.

In addition, the software executed by the processor may include not only software distributed through the media 152 but also software appropriately downloaded through a distribution server.

In addition, the configuration for providing the functions and executing the processes according to the present embodiment is not limited to the control unit 110 shown in FIG. 2, and can be implemented by using any technology according to the time of the implementation.

C. Authenticated IP Address

Next, a process for providing an authenticated IP address to each device 100 and the like will be described.

(c1: IP Address Determination Process)

In the network system 1 according to the present embodiment, typically, the IP address of each device 100 is authenticated by using an authenticated IP address. As an example, the IP address of each device 100 may be authenticated by using a public key infrastructure (PKI).

Figure 4:
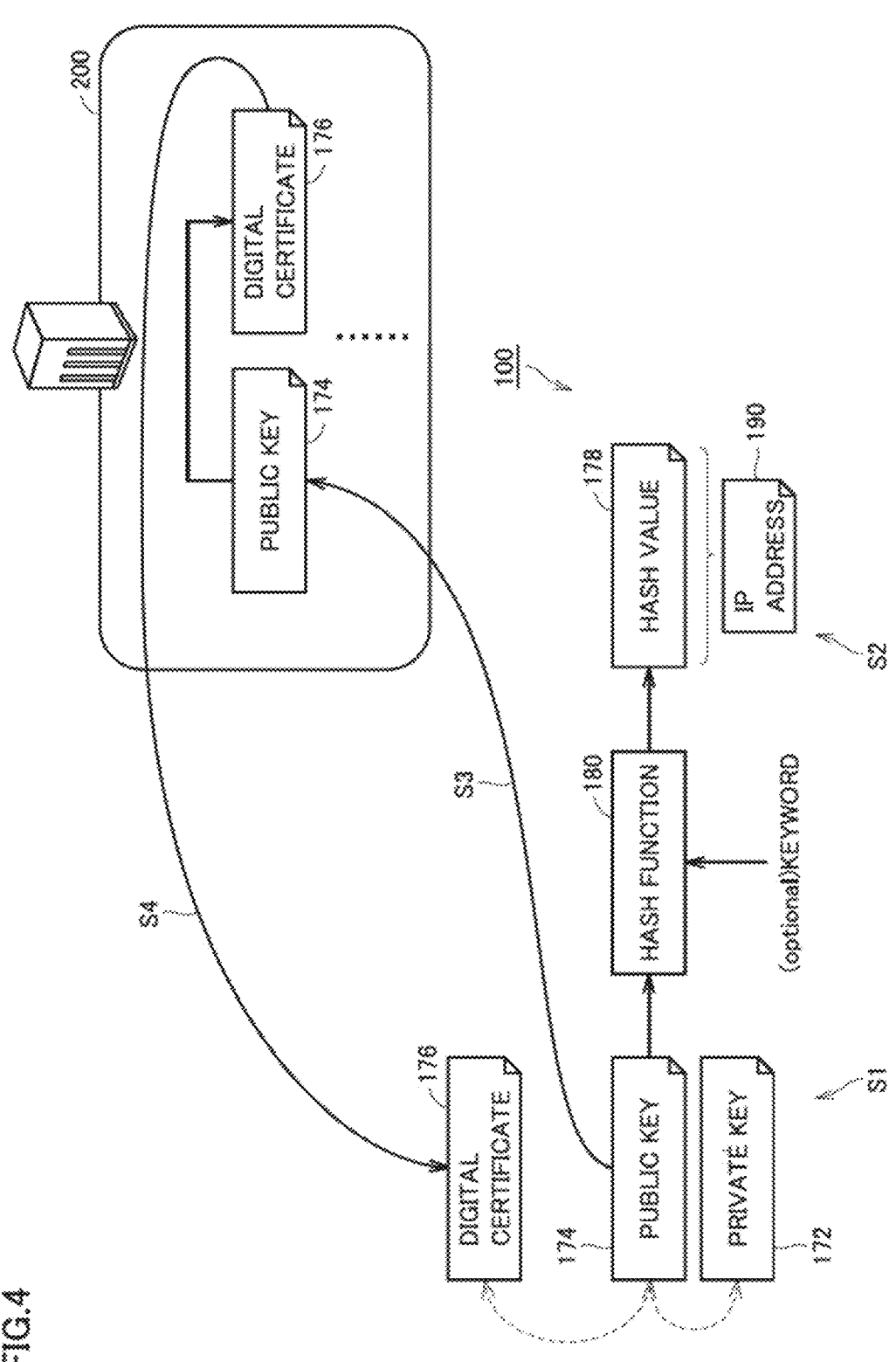
FIG. 4 is a diagram for describing an IP address authentication procedure in the network system according to the present embodiment.

FIG. 4 is a diagram for describing an IP address authentication procedure in the network system 1 according to the present embodiment. In addition, reference numerals such as "S1" to "S4" in FIG. 4 correspond to step numbers shown in FIG. 6.

Referring to FIG. 4, the device 100 has a key pair of the private key 172 and the public key 174. A hash value 178 is calculated by inputting the public key 174 into a predetermined hash function 180, and the entirety or part of the calculated hash value 178 is used as an IP address 190 of the device 100.

According to such a process of determining the IP address 190, the device 100 transmits the public key 174 to the certificate authority 200, and associates the digital certificate 176 issued by the certificate authority 200 with the public key 174. The device 100 transmits the public key 174 and the digital certificate 176 of the device itself to another device. Another device checks the validity of the IP address 190 of the device 100 based on the public key 174 and the digital certificate 176 published by the device 100. When the validity of the IP address 190 is confirmed, data communication is started using the IP address 190 whose validity has been confirmed. The device itself and another device can communicate directly with each other, but in addition to the direct communication processing, inquiry processing at the certificate authority 200 may be included.

As described above, in the network system 1 according to the present embodiment, the IP address 190 itself can be authenticated. By holding such an authenticated IP address 190 in the device itself, it is possible to build an independent network without using a statically or dynamically assigned IP address for each device.

Hereinafter, the details of the process for providing the authenticated IP address in the network system 1 according to the present embodiment will be described.

The private key 172 and the public key 174, which are a key pair, may be generated by the device 100 itself, or may be provided from the outside and stored in the device 100 in advance. When the private key 172 and the public key 174 are provided from the outside, the device 100 may acquire only the private key 172 and generate the public key 174 by itself.

As an example of a method of generating the private key 172 and the public key 174 which are a key pair, a bit string of a predetermined length (for example, 512 bits) generated by a random number generator may be used as the private key 172, and the public key 174 having a bit string of a predetermined length (for example, 256 bits) may be generated from the private key 172 according to a known cryptographic algorithm (for example, an elliptic curve cryptographic algorithm). In addition, when the device 100 itself generates the key pair, the random number generator may be realized by using the function provided by the OS 160, or may be realized by using a hard-wired circuit, such as an ASIC.

As the hash function 180, a known irreversible cryptographic hash function (for example, BLAKE) can be used.

The hash function 180 calculates the hash value 178 having a bit string of a predetermined length (for example, 256 bits).

Not only the public key 174 but also an arbitrary keyword may be input to the hash function 180. As an arbitrary keyword, a message associated with a predetermined organization may be used. As the message associated with a predetermined organization, a message including the name of the trademark owned by the predetermined organization may be used. For example, the name (for example, "connectFree") of a registered trademark owned by the predetermined organization may be used as a keyword to be input to the hash function 180. By adopting such an implementation method, it is possible to prevent a third party other than the predetermined organization from implementing the network system 1 according to the present embodiment, a relevant method or program, and the like without the permission of the predetermined organization.

The entirety or part of the hash value 178 calculated by the hash function 180 is used as the IP address 190. For example, when a 256-bit (64 digits in hexadecimal notation) hash value 178 is calculated, any 32 digits (for example, first 32 digits) of the 64-digit hash value 178 may be used as the IP address 190 (128 bits) corresponding to IPV6. Alternatively, the first eight digits of the 64-digit hash value 178 may be determined as the IP address 190 (32 bits) corresponding to IPv4.

Alternatively, a 128-bit hash value 178 may be calculated from the hash function 180 in consideration of the IP address 190 (128 bits) corresponding to IPV6. In this case, the entirety of the calculated hash value 178 can be determined as the IP address 190 (128 bits) corresponding to IPv6.

According to the present embodiment, the IP address 190 unique to the device 100 can be determined based on the public key 174 of the device 100. Thus, the device 100 can be connected to a network, such as the Internet, by using the IP address 190 determined by the device 100. In addition, even if there is no service provider (server) that manages the global IP address, such as an Internet service provider (ISP), the device 100 can perform data communication using the IP address 190 determined by itself. In addition, even if there is no server that manages private IP addresses such as a DHCP (Dynamic Host Configuration Protocol) server mounted on an access point or the like, the device 100 can perform data communication by making a connection to a global network, such as the Internet, using the IP address 190 determined by itself. Therefore, it is possible to improve the user experience and user convenience for connecting to a network, such as the Internet.

(c2: Unique Character String)

It may be possible to identify that the IP address 190 determined by the device 100 has been determined according to the processing procedure according to the present embodiment. In order to perform such identification, for example, the IP address 190 may include a predetermined eigenvalue (unique character string) for identification. That is, the determined IP address may include a predetermined eigenvalue (unique character string) for identification.

As an example, the first two digits (first and second digits from the beginning) of the IP address 190 in hexadecimal notation may be fixed to a predetermined unique character string (for example, "FC"). Usually, since the hash function 180 is a one-way function, the public key 174 cannot be calculated back from the IP address 190. For this reason, the private key 172 and the public key 174 may be repeatedly generated using a random number generator until the determined IP address 190 satisfies predetermined conditions (in this case, the first two digits become a predetermined eigenvalue). That is, the public key 174 may be determined so that the IP address 190 determined based on the hash value calculated from the public key 174 according to the hash function conforms to a predetermined format.

In this manner, by making a predetermined eigenvalue (for example, the first two digits are "FC") for identification be included in the IP address 190, a third party can determine whether or not the IP address 190 of the device 100 has been determined by the device 100 itself.

(c3: Type Identification Information)

The IP address 190 determined by the device 100 may include information by which the type of the device 100 can be identified. In order to perform such identification, for example, the IP address 190 may include a value corresponding to the type of the device 100. That is, the determined IP address 190 may include a value corresponding to the type of the device 100 that has determined the IP address 190.

As an example, a value (type identification information) corresponding to the type of the device 100 may be embedded in the third and fourth digits from the beginning of the IP address 190 in hexadecimal notation.

FIG. 5 is a diagram showing an example of type identification information embedded in the IP address used in the network system 1 according to the present embodiment. The type identification information shown in FIG. 5 may be stored in advance in the ROM 108 (see FIG. 2) of the control unit 110 of each device 100. As an example, a value corresponding to the type of device shown in FIG. 5 can be used.

As shown in FIG. 5, for example, when the type of the device 100 is a personal computer, a value "00" indicating the personal computer is set in the third and fourth digits from the beginning of the IP address 190.

As described above, since the hash function 180 is usually a one-way function, the public key 174 cannot be calculated back from the IP address 190. For this reason, the private key 172 and the public key 174 may be repeatedly generated using a random number generator until the determined IP address 190 satisfies predetermined conditions (in this case, the third and fourth digits from the beginning become a value indicating the type of the device 100). That is, the public key 174 may be determined so that the IP address 190 determined based on the hash value calculated from the public key 174 according to the hash function conforms to a predetermined format.

In this manner, by making the value indicating the type of the device 100 be included in the IP address 190, a third party can identify the type of the device 100 from the IP address 190 determined by the device 100.

(c4: Registration of Public Key 174 and Acquisition of Digital Certificate 176)

Next, the registration of the public key 174 and the acquisition of the digital certificate 176 will be described.

The device 100 acquires the digital certificate 176 for proving the validity of the public key 174 from the certificate authority 200. As a procedure for acquiring the digital certificate 176, the public key 174 is transmitted from the device 100 to the certificate authority 200 for registration, and the digital certificate 176 associated with the registered public key 174 is acquired from the certificate authority 200.

More specifically, the device 100 (control unit 110) transmits the public key 174 and a digital certificate issuance request (hereinafter, also referred to as a "certificate signing request") to the certificate authority 200 through the network. In response to the certificate signing request received from the device 100, the certificate authority 200 registers the public key 174 and issues the digital certificate 176 associated with the registered public key 174. Then, the certificate authority 200 transmits the digital certificate 176 to the device 100 through the network.

Typically, the digital certificate 176 includes owner information of the digital certificate 176 (in this example, the device 100), issuer information of the digital certificate 176 (in this example, the certificate authority 200), digital signature of the issuer, expiration date of the digital certificate 176, and the like.

The certificate authority 200 may be operated by a predetermined organization, or may be an intermediate certificate authority associated with a root certificate authority operated by a predetermined organization. In addition, in registering the public key 174 and issuing the digital certificate 176 associated with the public key 174, a predetermined fee and/or a maintenance fee may be required for a predetermined organization.

According to the present embodiment, the public key 174 is directly authenticated by the certificate authority 200 through the registration of the public key 174 and the acquisition of the public key 174, so that the IP address 190 determined based on the public key 174 is indirectly authenticated by the certificate authority 200. By such authentication by the certificate authority 200, the device 100 can realize data communication through the network by using the authenticated IP address 190.

In addition, the digital certificate 176 associated with the public key 174 may include information relevant to the attributes (hereinafter, also referred to as "attribute information") of the device 100 in order to improve confidentiality. As the attribute information of the device 100, for example, the version information of the OS 160 of the device 100 or the communication processing program 170 and the serial number of the hardware (for example, a processor or a storage) forming the device 100 can be used. In this case, the device 100 may transmit the attribute information of the device 100 to the certificate authority 200 when transmitting the public key 174 and the certificate signing request. In addition, the attribute information of the device 100 included in the digital certificate 176 may be encrypted by a known irreversible cryptographic hash function or the like.

In this manner, by making the attribute information of the device 100 be included in the digital certificate 176, it is possible to authenticate that the digital certificate 176 has been issued in response to the certificate signing request from the device 100 itself. That is, it is possible to more reliably prevent a device other than the device 100 from impersonating the device 100 and using the public key 174 and the digital certificate 176 of the device 100.

(c5: Processing Procedure)

Next, a processing procedure for providing an authenticated IP address in each device 100 will be described.

Figure 6:
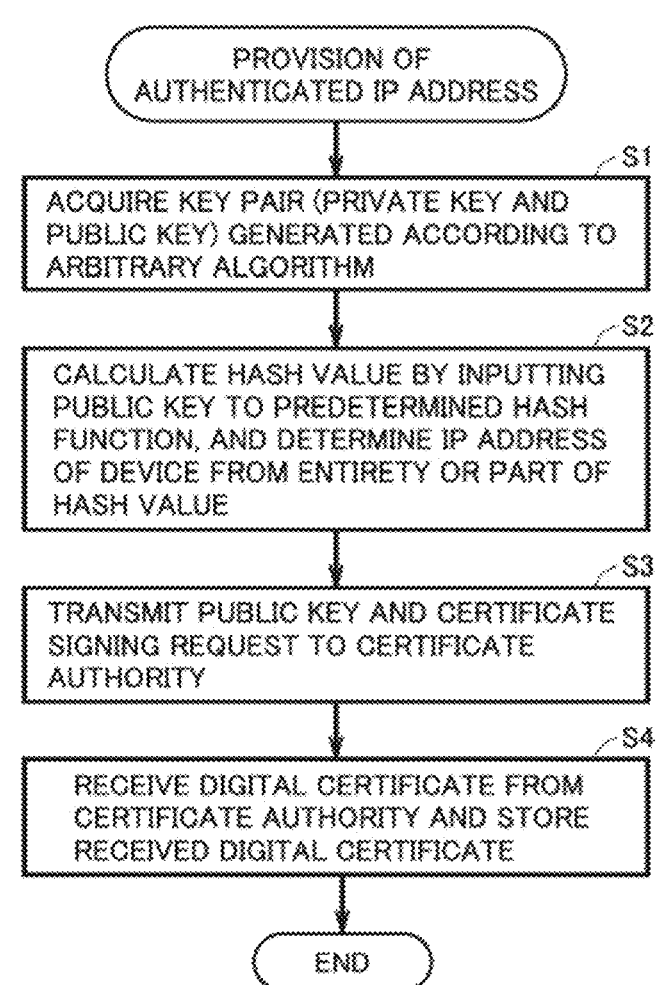
FIG. 6 is a flowchart showing a processing procedure in which a device provides an authenticated IP address in the network system according to the present embodiment.

FIG. 6 is a flowchart showing a processing procedure in which the device 100 provides an authenticated IP address in the network system 1 according to the present embodiment. The processing procedure shown in FIG. 6 is executed in each device 100, and each step shown in FIG. 6 is executed by the control unit 110 of each device 100.

Referring to FIG. 6, the device 100 acquires a key pair (the private key 172 and the public key 174) generated according to an arbitrary algorithm (step S1). This key pair may be generated by the device 100 itself, or may be acquired from the outside by the device 100. Alternatively, the device 100 may acquire only the private key 172 from the outside and generate the public key 174 internally.

Then, the device 100 calculates the hash value 178 by inputting the public key 174 to the predetermined hash function 180, and determines the IP address 190 of the device 100 from the entirety or part of the calculated hash value 178 (step S2). That is, the device 100 determines the IP address of the device itself based on the hash value 178 calculated from the public key 174 according to the hash function 180.

In addition, an appropriate key pair (the private key 172 and the public key 174) may be generated so that a unique character string (for example, the first and second digits from the beginning of the IP address 190) and/or type identification information (for example, the third and fourth digits from the beginning of the IP address 190) are included in the IP address 190.

In addition, the device 100 transmits the public key 174 and a digital certificate issuance request (certificate signing request) to the certificate authority 200 (step S3). In response to the certificate signing request received from the device 100, the certificate authority 200 registers the public key 174 and issues the digital certificate 176 associated with the registered public key 174. Then, the certificate authority 200 transmits the digital certificate 176 to the device 100 through the network. Then, the device 100 receives the digital certificate 176 from the certificate authority 200 and stores the digital certificate 176 (step S4).

In this manner, the device 100 acquires the digital certificate 176 associated with the public key 174 from the certificate authority.

In addition, the execution order of the processing of step S2 and the processing of steps S3 and S4 does not matter.

D. Data Communication Processing

Next, data communication processing between the devices 100 using the authenticated IP address will be described.

(d1: IP Address Notification)

First, a process relevant to IP address notification between the devices 100 in the network system 1 according to the present embodiment will be described.

Figure 7:
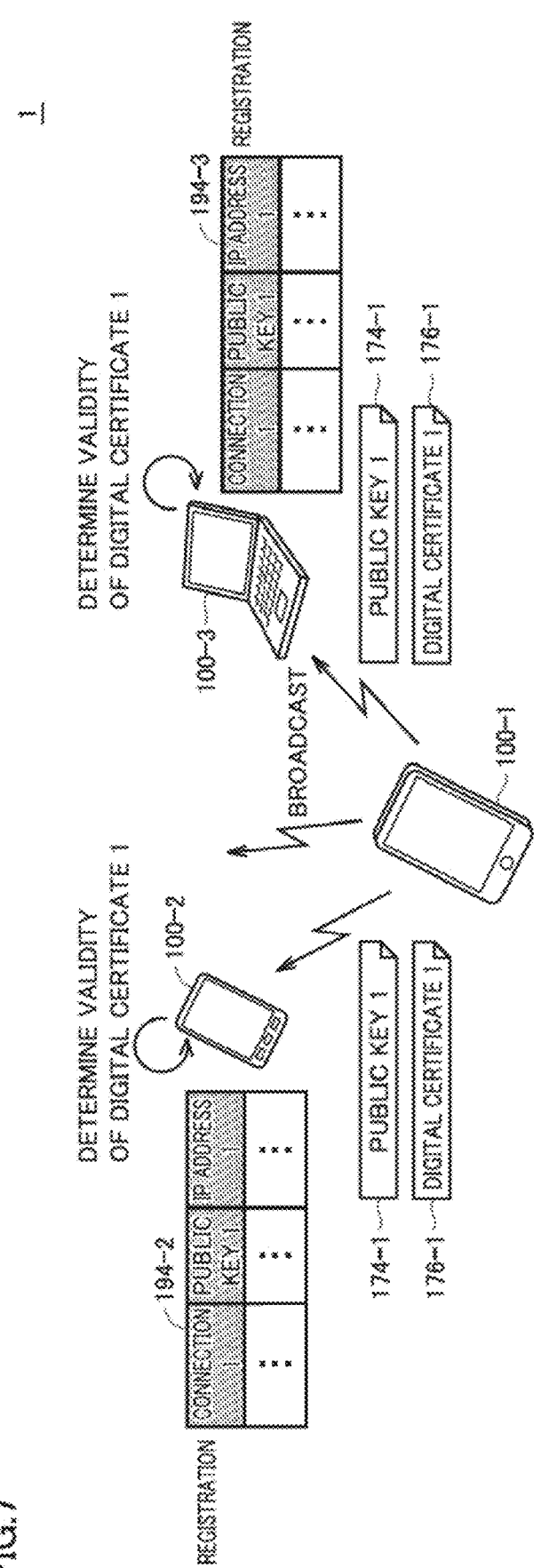
FIG. 7 is a diagram for describing a process relevant to IP address notification in the network system according to the present embodiment.
Figure 8:
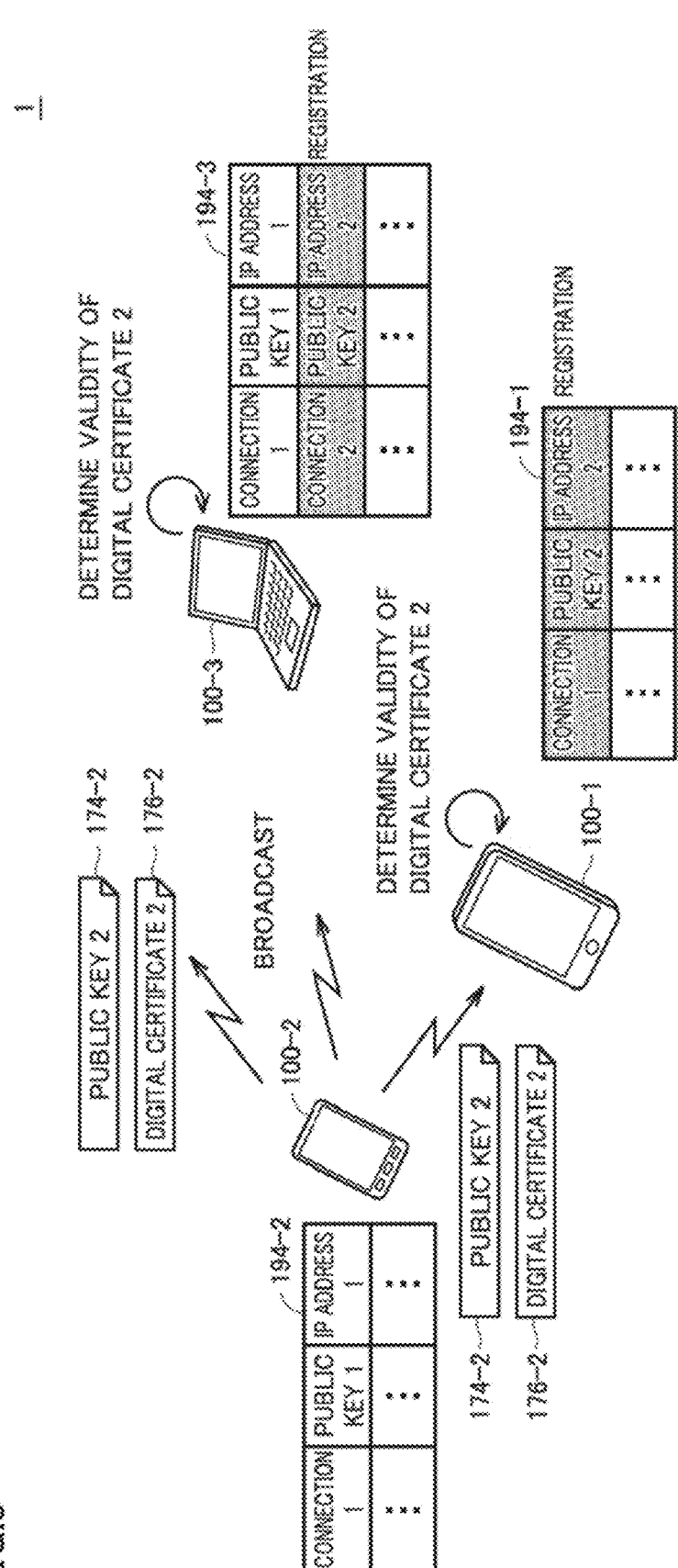
FIG. 8 is a diagram for describing a process relevant to IP address notification in the network system according to the present embodiment.

FIGS. 7 and 8 are diagrams for describing the process relevant to the IP address notification in the network system 1 according to the present embodiment. FIGS. 7 and 8 show examples of exchanging IP addresses between three devices 100-1, 100-2, and 100-3. In addition, the same processing can be performed between the two devices 100, or the same processing can be performed among a larger number of devices 100.

In the state shown in FIGS. 7 and 8, it is assumed that the devices 100-1, 100-2, and 100-3 have determined IP addresses 190-1, 190-2, and 190-3, respectively, according to the procedure described above and the devices 100-1, 100-2, and 100-3 have completed the registration of public keys 174-1, 174-2, and 174-3 in the certificate authority 200 and the acquisition of digital certificates 176-1, 176-2, and 176-3 from the certificate authority 200.

As shown in FIGS. 7 and 8, each device 100 transmits (broadcasts) the public key 174 and the digital certificate 176 associated with the public key 174 of each device regularly or every event. That is, each device 100 transmits the public key 174 and the digital certificate 176 to another device. In addition, if the public key 174 is included in the digital certificate 176, only the digital certificate 176 may be transmitted.

FIG. 7 shows an example in which the device 100-1 transmits (broadcasts) the public key 174-1 and the digital certificate 176-1 associated with the public key 174-1. In the example shown in FIG. 7, it is assumed that the devices 100-2 and 100-3 can receive the public key 174-1 and the digital certificate 176-1 transmitted from the device 100-1. Then, the devices 100-2 and 100-3 determine whether or not the digital certificate 176-1 is valid. If it is determined that the digital certificate 176-1 is valid, the devices 100-2 and 100-3 determine the IP address 190-1 of the device 100-1 based on the associated public key 174-1 and register these in connection tables 194-2 and 194-3, respectively.

Here, the connection table includes information of each device 100 for data communication, and each device 100 identifies the IP address of the destination device 100 or the like and establishes a necessary session with reference to the connection table.

More specifically, the device 100-2 first determines whether or not the digital certificate 176-1 broadcast from the device 100-1 is valid. In the process of determining the validity, the integrity of the digital certificate 176-1 is verified.

As an example of the process for verifying integrity, first, the device 100-2 checks the owner information of the digital certificate 176-1, the issuer information of the digital certificate 176-1, and the presence of the issuer's digital signature. Then, the device 100-2 determines whether or not the digital certificate 176-1 is within the expiration date. In addition, the device 100-2 determines whether or not the issuer of the digital certificate 176-1 is reliable. In particular, when the digital certificate 176-1 is issued by an intermediate certificate authority, the device 100-2 identifies the root certificate authority associated with the intermediate certificate authority that has issued the digital certificate 176-1, and determines whether or not the identified root certificate authority is reliable. For example, when the identified root certificate authority matches one root certificate authority or any of a plurality of root certificate authorities stored in the device 100-1, it is determined that the issuer of the digital certificate 176-1 is reliable.

If the determination process described above is passed, the device 100-2 determines that the digital certificate 176-1 broadcast from the device 100-1 is valid. Then, the device 100-2 calculates a hash value 178-1 by inputting the public key 174-1 broadcast from the device 100-1 to the predetermined hash function 180, and determines the IP address 190-1 of the device 100-1 using the entirety or part of the calculated hash value 178-1. Here, it is assumed that the devices 100-1 and 100-2 have a common hash function 180. In addition, it is assumed that the process of determining the IP address 190-1 from the hash value 178-1 is also common between the devices 100-1 and 100-2.

Through the above processing, the device 100-2 can determine the IP address 190-1 of the device 100-1. Then, the device 100-2 adds the entry of the determined IP address 190-1 of the device 100-1 to the connection table 194-2. In addition, the public key 174-1 may be registered in association with the IP address 190-1.

In addition, the same processing as in the device 100-2 is executed in the device 100-3, and the entry of the determined IP address 190-1 of the device 100-1 is added to the connection table 194-3 of the device 100-3. The public key 174-1 may be registered in association with the IP address 190-1.

By the processing shown in FIG. 7, the device 100-2 and the device 100-3 can acquire the IP address 190-1 of the device 100-1.

FIG. 8 shows an example in which the device 100-2 transmits (broadcasts) the public key 174-2 and the digital certificate 176-2 associated with the public key 174-2. In the example shown in FIG. 8, it is assumed that the devices 100-1 and 100-3 can receive the public key 174-2 and the digital certificate 176-2 transmitted from the device 100-2. Then, the devices 100-1 and 100-3 determine whether or not the digital certificate 176-2 is valid. If it is determined that the digital certificate 176-2 is valid, the devices 100-1 and 100-3 determine the IP address 190-2 of the device 100-2 based on the associated public key 174-2 and register these in connection tables 194-1 and 194-3, respectively.

Since a series of processes executed by the devices 100-1 and 100-3 are the same as the processes described with reference to FIG. 7, the detailed description will not be repeated. By the processing shown in FIG. 8, the device 100-1 and the device 100-3 can acquire the IP address 190-2 of the device 100-2.

In addition, the device 100-3 may transmit (broadcast) the public key 174-3 and the digital certificate 176-3 associated with the public key 174-3. It is assumed that the devices 100-1 and 100-2 can receive the public key 174-3 and the digital certificate 176-3 transmitted from the device 100-3. Then, the devices 100-1 and 100-2 determine whether or not the digital certificate 176-3 is valid. If it is determined that the digital certificate 176-3 is valid, the devices 100-1 and 100-2 determine the IP address 190-3 of the device 100-3 based on the associated public key 174-3 and register these in the connection tables 194-1 and 194-2, respectively. By such processing, the device 100-1 and the device 100-2 can acquire the IP address 190-3 of the device 100-3.

Figure 9:
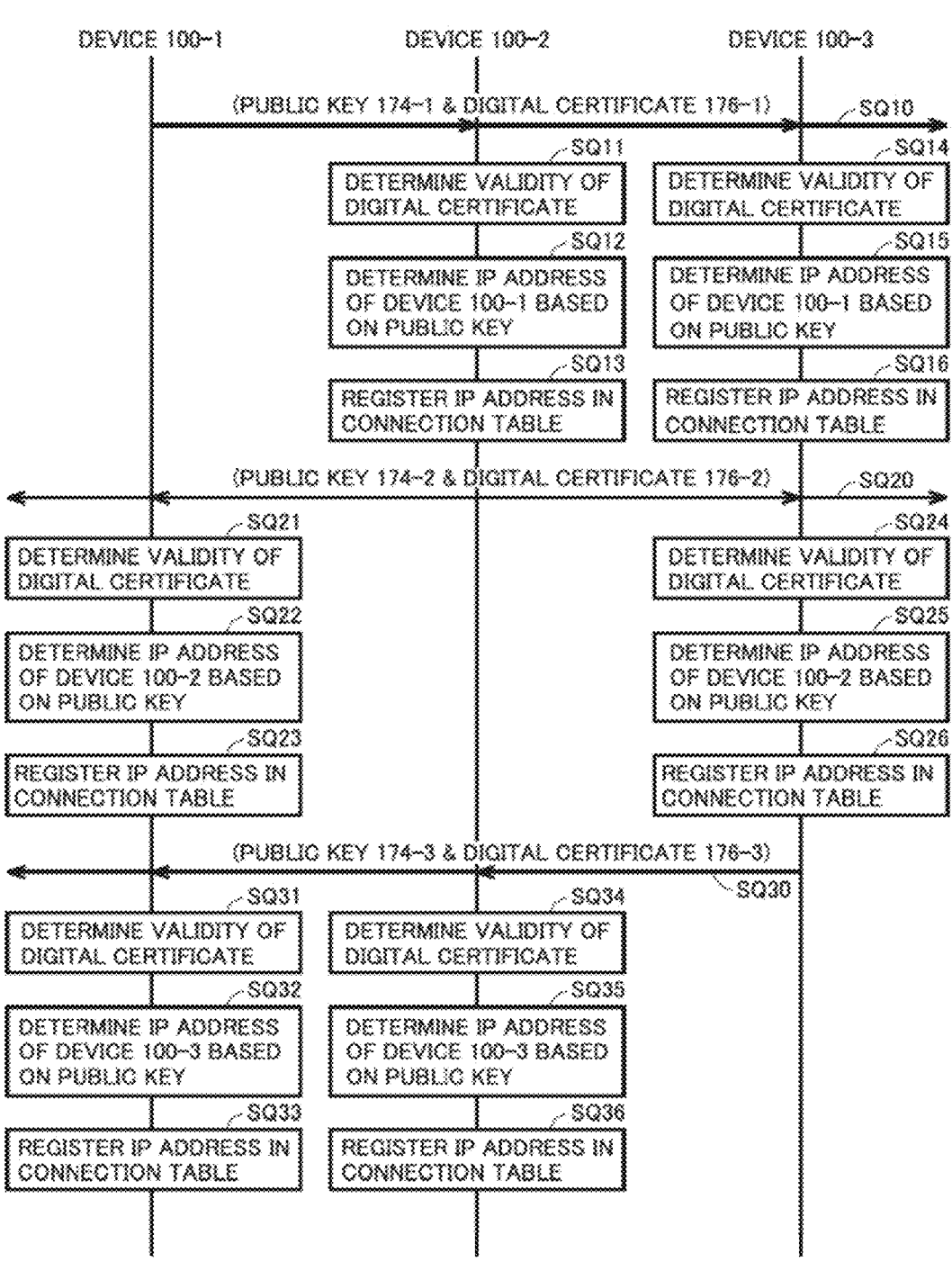
FIG. 9 is a sequence chart showing a processing procedure relevant to IP address notification in the network system according to the present embodiment.

FIG. 9 is a sequence chart showing a processing procedure relevant to IP address notification in the network system 1 according to the present embodiment. FIG. 9 shows processing procedures in the three devices 100-1, 100-2, and 100-3 so as to correspond to FIGS. 7 and 8.

The device 100-1 transmits (broadcasts) the public key 174-1 and the digital certificate 176-1 associated with the public key 174-1 (sequence SQ10).

Upon receiving the public key 174-1 and the digital certificate 176-1 transmitted from the device 100-1, the device 100-2 determines the validity of the digital certificate 176-1 (sequence SQ11). When it is determined that the digital certificate 176-1 is valid, the device 100-2 determines the IP address 190-1 of the device 100-1 based on the public key 174-1 (sequence SQ12), and registers the determined IP address 190-1 of the device 100-1 in the connection table 194-2 (sequence SQ13).

Similarly, upon receiving the public key 174-1 and the digital certificate 176-1 transmitted from the device 100-1, the device 100-3 determines the validity of the digital certificate 176-1 (sequence SQ14). When it is determined that the digital certificate 176-1 is valid, the device 100-3 determines the IP address 190-1 of the device 100-1 based on the public key 174-1 (sequence SQ15), and registers the determined IP address 190-1 of the device 100-1 in the connection table 194-3 (sequence SQ16).

In addition, the device 100-2 transmits (broadcasts) the public key 174-2 and the digital certificate 176-2 associated with the public key 174-2 (sequence SQ20).

Upon receiving the public key 174-2 and the digital certificate 176-2 transmitted from the device 100-2, the device 100-1 determines the validity of the digital certificate 176-2 (sequence SQ21). When it is determined that the digital certificate 176-2 is valid, the device 100-1 determines the IP address 190-2 of the device 100-2 based on the public key 174-2 (sequence SQ22), and registers the determined IP address 190-2 of the device 100-2 in the connection table 194-1 (sequence SQ23).

Similarly, upon receiving the public key 174-2 and the digital certificate 176-2 transmitted from the device 100-2, the device 100-3 determines the validity of the digital certificate 176-2 (sequence SQ24). When it is determined that the digital certificate 176-2 is valid, the device 100-3 determines the IP address 190-2 of the device 100-2 based on the public key 174-2 (sequence SQ25), and registers the determined IP address 190-2 of the device 100-2 in the connection table 194-3 (sequence SQ26).

In addition, the device 100-3 transmits (broadcasts) the public key 174-3 and the digital certificate 176-3 associated with the public key 174-3 (sequence SQ30).

Upon receiving the public key 174-3 and the digital certificate 176-3 transmitted from the device 100-3, the device 100-1 determines the validity of the digital certificate 176-3 (sequence SQ31). When it is determined that the digital certificate 176-3 is valid, the device 100-1 determines the IP address 190-3 of the device 100-3 based on the public key 174-3 (sequence SQ32), and registers the determined IP address 190-3 of the device 100-3 in the connection table 194-1 (sequence SQ33).

Similarly, upon receiving the public key 174-3 and the digital certificate 176-3 transmitted from the device 100-3, the device 100-2 determines the validity of the digital certificate 176-3 (sequence SQ34). When it is determined that the digital certificate 176-3 is valid, the device 100-2 determines the IP address 190-3 of the device 100-3 based on the public key 174-3 (sequence SQ35), and registers the determined IP address 190-3 of the device 100-3 in the connection table 194-2 (sequence SQ36).

In addition, the processes of sequences SQ10 to SQ16, the processes of sequences SQ20 to SQ26, and the processes of sequences SQ30 to SQ36 can be executed in any order or in parallel.

Thus, when the public key 174 and the digital certificate 176 associated with the public key 174 are received from another device, each device 100 determines the validity of the digital certificate 176 (sequences SQ11, SQ14, SQ21, SQ24, SQ31, and SQ34). Then, when it is determined that the digital certificate 176 is valid, each device 100 determines the IP address of another device based on the hash value calculated from the public key 174 according to the hash function (sequences SQ12, SQ15, SQ22, SQ25, SQ32, and SQ35).

As described above, in the network system 1 according to the present embodiment, on the condition that the digital certificate 176 transmitted from another device 100 is determined to be valid, the IP address 190 of another device 100 is determined based on the public key 174 associated with the digital certificate 176. Since the IP address 190 is determined based on the public key 174 on the condition that the digital certificate 176 associated with the public key 174 is valid, the validity of the public key 174 and the validity of the IP address 190 can be guaranteed. Therefore, it is possible to realize reliable data communication between the devices 100.

In addition, in the network system 1 according to the present embodiment, since the IP address of each device 100 can be known based on the public key 174 broadcast from each device 100, the devices 100 can be directly connected to each other even if there is no server that manages IP addresses. In particular, even if there is no virtual private network (VPN) server or the like, it is possible to realize communication in which confidentiality is ensured between the devices 100, so that the cost and power consumption for maintaining the VPN server can be reduced.

(d2: Application Example)

In the network system 1 according to the present embodiment, since the IP address can be authenticated between the devices 100, the communication destination can be specified only based on the IP address. By using such an authenticated IP address, various services can be provided. Hereinafter, an example of the service provided by using the authenticated IP address will be described.

Figure 10:
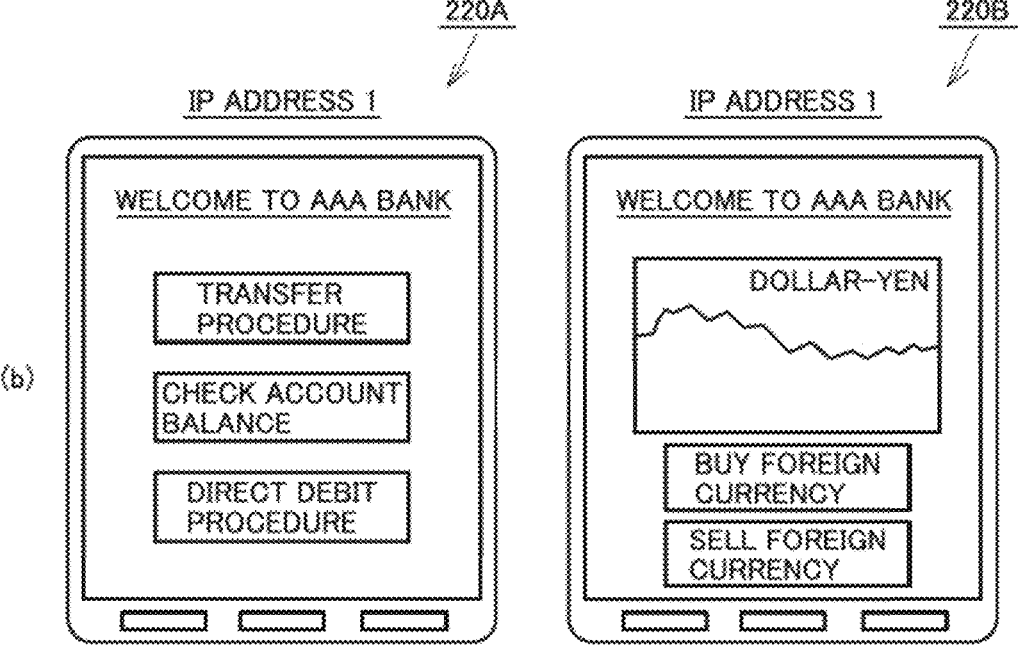
FIG. 10 is a diagram for describing an application example for providing a service using the network system according to the present embodiment.

FIG. 10 is a diagram for describing an application example for providing a service using the network system 1 according to the present embodiment. In the application example shown in FIG. 10, each of a Web-based application server and a mobile terminal accessing the application server is assumed to be the device 100. The application server provides a unique Web page according to the authenticated IP address of the mobile terminal as an access source.

FIG. 10(*a*) shows an example of a network management table 210 held by an application server. In the network management table 210, initial screen information 214 indicating an initial screen and preference information 216 indicating preference are defined so as to be associated with an authenticated IP address 212 of the mobile terminal that has accessed the application server in the past or is to access the server. The content of the network management table 210 may be updated manually by the user, or may be updated by the application server according to the operation of the user.

When there is an access from the mobile terminal, the application server determines the corresponding initial screen information 214 and preference information 216 with reference to the network management table 210 using the authenticated IP address assigned to the mobile terminal as a key. Then, the application server determines the content of a Web page to be provided to the mobile terminal as an access source based on the determined initial screen information 214 and preference information 216.

FIG. 10(*b*) shows an example of a Web screen when an application server provides an online banking service. For example, in a Web screen example 220A presented on the display of the mobile terminal to which an authenticated IP address 1 is assigned, basic account management buttons such as "transfer procedure", "account balance check", and "direct debit procedure" are arranged. On the other hand, in a Web screen example 220B presented on the display of the mobile terminal to which an authenticated IP address 2 is assigned, buttons relevant to foreign currencies such as "buy foreign currency" and "sell foreign currency" are arranged together with a chart showing the temporal change of the exchange rate.

Such an initial screen can be determined by referring to, for example, the initial screen information 214 of the network management table 210. In addition, by referring to the preference information 216 of the network management table 210 and the like, it is possible to provide not only the initial screen but also a service according to preference for each mobile terminal (that is, a user who operates the mobile terminal).

As described above, the Web-based application server provides a service according to the authenticated IP address of the mobile terminal in response to the request from the mobile terminal. Therefore, it is possible to customize the initial screen and various service contents provided when accessing the application server based on the authenticated IP address of the mobile terminal.

Figure 11:
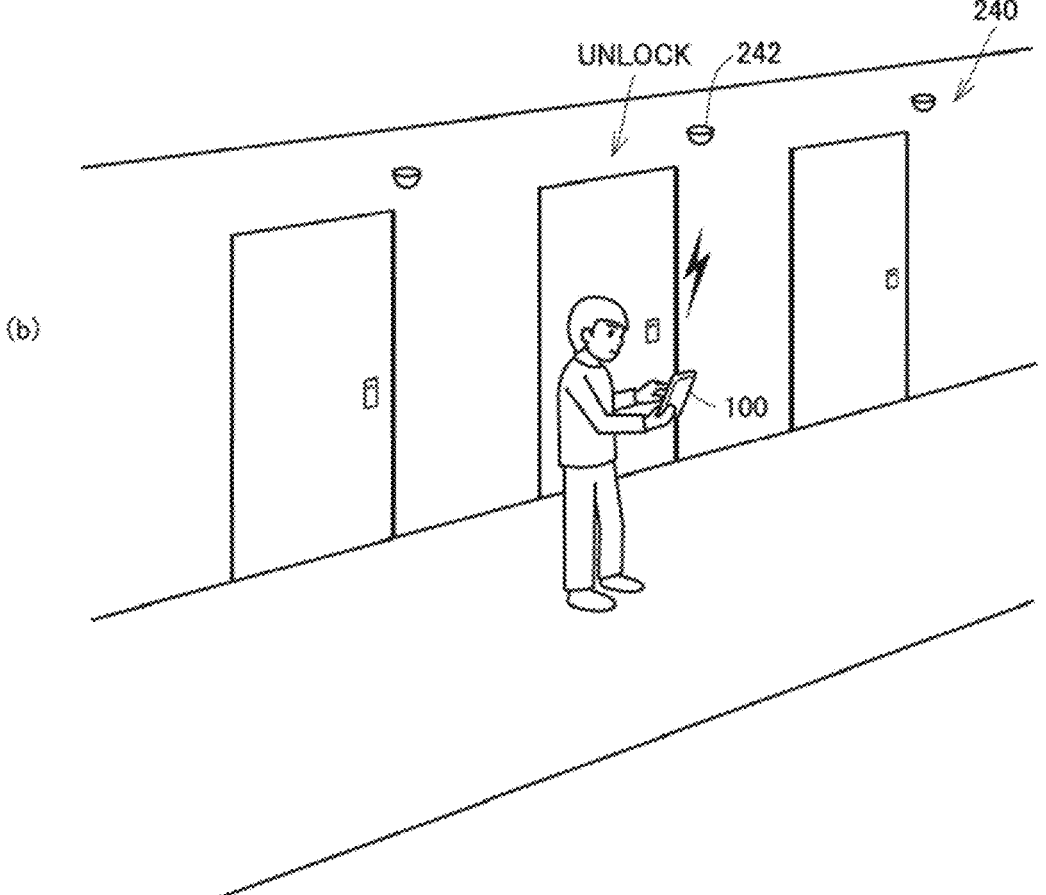
FIG. 11 is a diagram for describing another application example for providing a service using the network system according to the present embodiment.

FIG. 11 is a diagram for describing another application example for providing a service using the network system 1 according to the present embodiment. In the application example shown in FIG. 11, each of a use management server in a hotel or the like and a mobile terminal accessing the use management server is assumed to be the device 100. In the application example shown in FIG. 11, the mobile terminal can be used as an electronic key (use card).

FIG. 11(*a*) shows an example of a use management table 230 held by a server. In the use management table 230, the content (room number 234 and available time 236) of reservation through a reservation site or the like is stored so as to be associated with a network address 232 assigned to the mobile terminal used for the reservation operation.

When the user operates his or her mobile terminal to make an accommodation reservation on the reservation site, the server adds the reservation content to the use management table 230 together with the network address assigned to the mobile terminal used for the accommodation reservation.

As shown in FIG. 11(*b*), a wireless communication unit 242 is arranged in front of each room of an accommodation facility 240. When a user who made an accommodation reservation approaches the reserved room with the mobile terminal used for the accommodation reservation, the wireless communication unit 242 wirelessly communicates with the mobile terminal. In addition, the wireless communication between the mobile terminal and the wireless communication unit 242 may be automatically started, or may be started after the user explicitly performs an operation.

When the network address assigned to the mobile terminal held by the user matches any entry of the network address 232 in the use management table 230, the server unlocks the reserved room based on the corresponding room number 234 and available time 236. In this manner, the server provides a service according to the authenticated IP address of the mobile terminal in response to the request from the mobile terminal.

FIG. 11 illustrates a configuration in which a mobile terminal is used as a key for each room of an accommodation facility, such as a hotel, as a typical example, but any use card can be used without being limited to thereto. For example, the mobile terminal itself can be used as an admission ticket for various facilities, such as amusement facilities, or various events, such as concerts. In addition, the mobile terminal itself can be used as a rail or air ticket.

In the network system 1 according to the present embodiment, since the IP address itself of the device 100 is authenticated, the device 100 itself can be used as a use card without the need for an application to display tickets unlike the known technology.

Thus, in the network system 1 according to the present embodiment, since the authenticated IP address of the mobile terminal can be acquired, it is possible to provide a service unique to each mobile terminal without the need for an application for realizing the authentication process. In addition, since data communication between devices, such as a mobile terminal and a server, means acquisition of the authenticated IP address, the time required to provide a service unique to the mobile terminal is very short. Therefore, compared with a configuration in which an application is used to perform authentication processing, the waiting time required to provide the service can be shortened.

(d3: Routing)

Next, processing relevant to data communication between the devices 100 will be described. In the network system 1 according to the present embodiment, each device 100 has a routing function and a data transmission function. Due to such functions, it is possible to realize a network capable of independently performing data communication.

The routing adopted by the network system 1 according to the present embodiment will be described. In the following description, as a typical example, it is assumed that data is transmitted in the form of a "packet".

Figure 12:
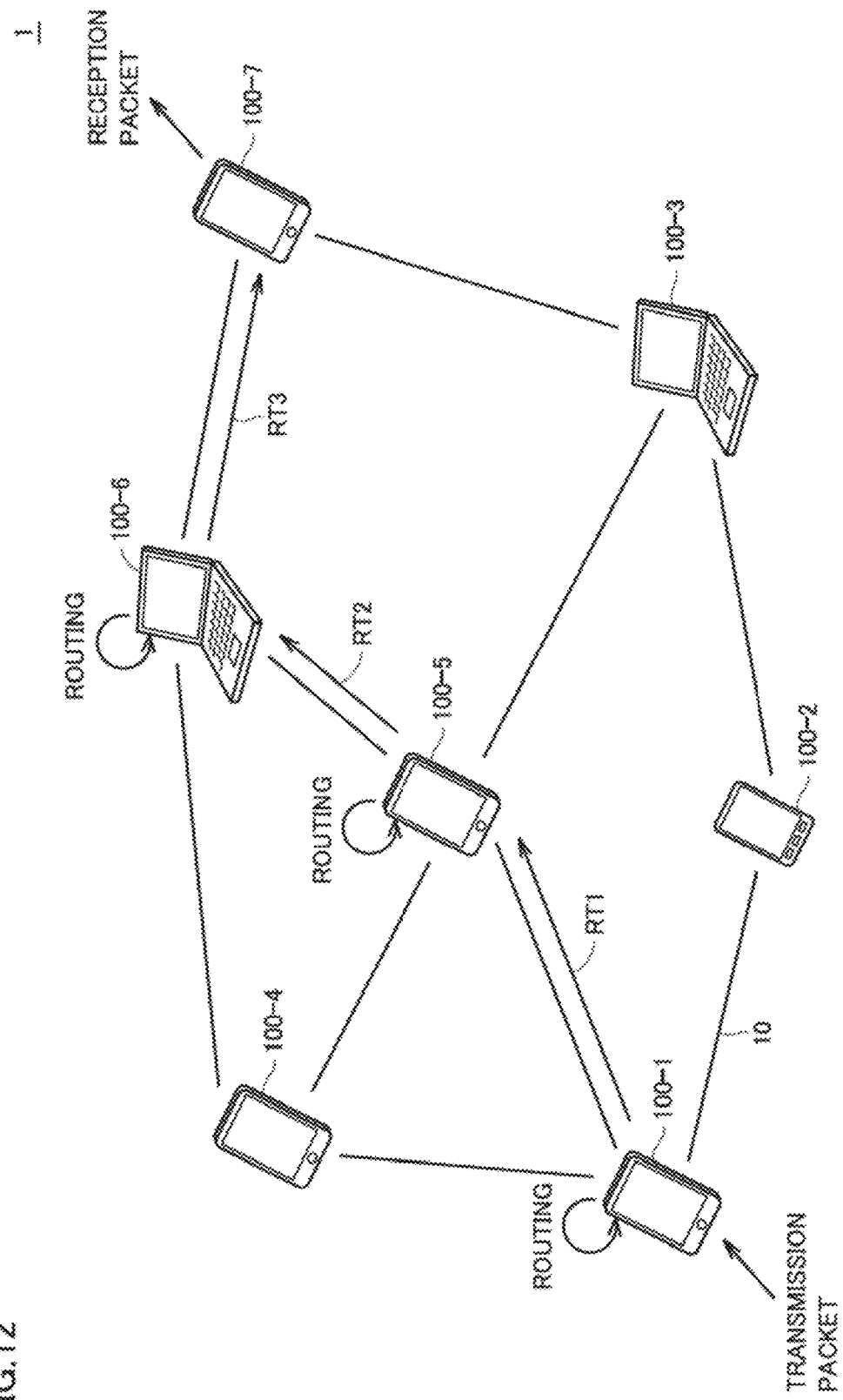
FIG. 12 is a diagram for describing an example of routing in the network system according to the present embodiment.

FIG. 12 is a diagram for describing an example of routing in the network system 1 according to the present embodiment. FIG. 12 illustrates routing in a network including seven devices 100-1 to 100-7 as an example.

As shown in FIG. 12, the devices 100 that have exchanged the IP addresses through the IP address notification process described above can establish a connection 10. The devices 100 that can establish the connection 10 therebetween exchange data with each other by a kind of peer-to-peer. In addition, for the connection 10 between the devices 100, any protocol including a TCP (Transmission Control Protocol) and a UDP (User Datagram Protocol) can be adopted.

For example, considering an example in which a transmission packet addressed to the device 100-7 is transmitted from the device 100-1, the transmission packet is transmitted from the device 100-1 to the device 100-5 by routing in the device 100-1 (route RT1), then the transmission packet is transmitted from the device 100-5 to the device 100-6 by routing in the device 100-5 (route RT2), and finally the transmission packet is transmitted from the device 100-6 to the device 100-7 by routing in the device 100-6 (route RT3).

Each of the devices 100 included in the network system 1 according to the present embodiment has the following functions in order to realize the routing shown in FIG. 12.

Figure 13:
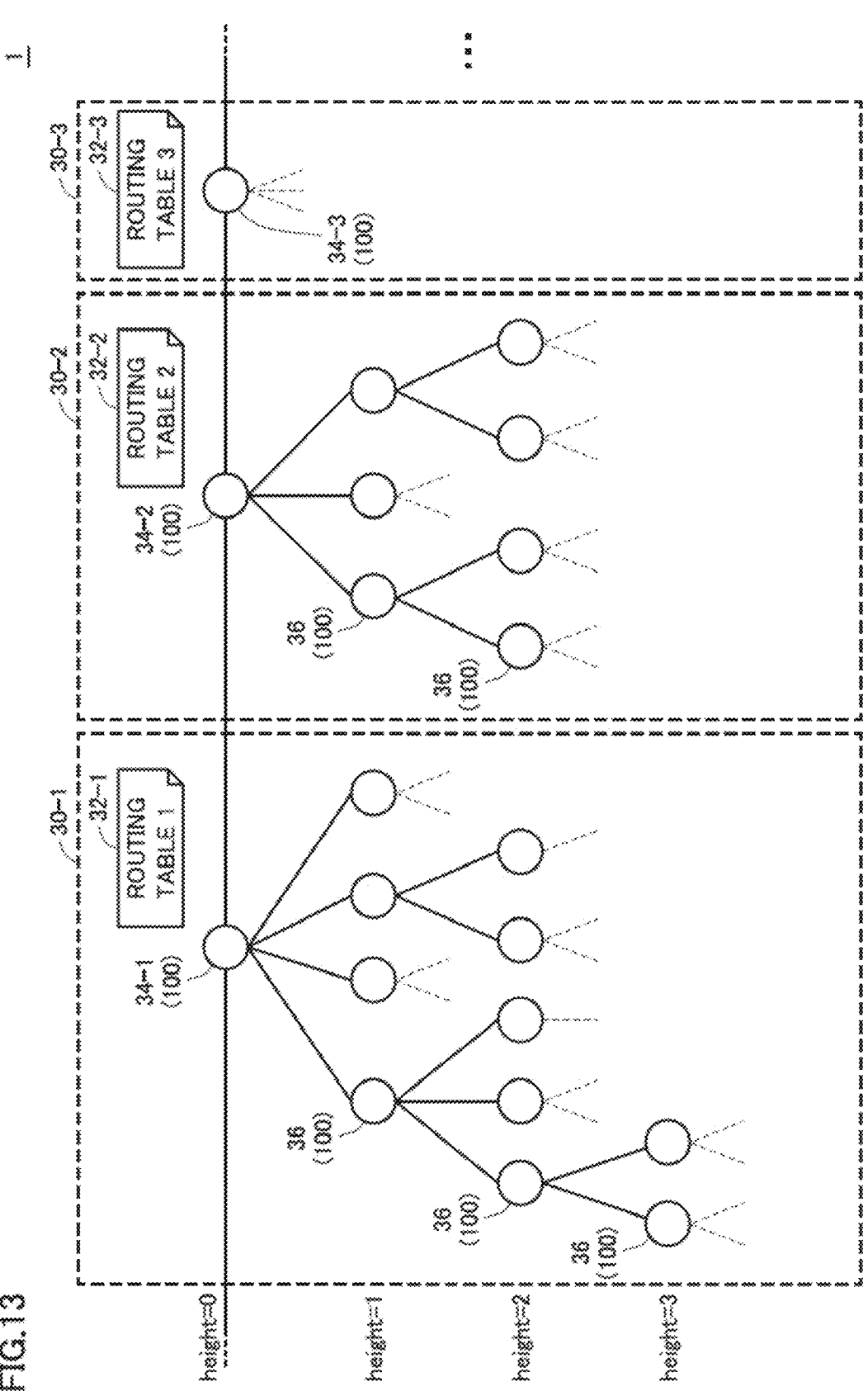
FIG. 13 is a diagram for describing a method of realizing the routing in the network system according to the present embodiment.

FIG. 13 is a diagram for describing a method of realizing the routing in the network system 1 according to the present embodiment. Referring to FIG. 13, in the network system 1 according to the present embodiment, a plurality of devices 100 included in the network system 1 are logically divided into one or more node groups 30 (node groups 30-1, 30-2, 30-3, . . . ), and each node group 30 shares a routing table 32 (routing tables 32-1, 32-2, 32-3, . . . ).

The node group 30 means a group of logically defined devices 100, and is determined based on the content of state information 40 held by each device 100, as will be described later.

The routing table 32 is a table used to search for the device 100 that is a destination for data transmission (destination of the transmission packet), and can be typically realized by using a distributed hash table (DHT). The routing table 32 includes identification information for identifying the device 100 (node) included in the corresponding node group 30, its position, and the like.

Each of the node groups 30 includes the device 100 as a root node 34 (root nodes 34-1, 34-2, 34-3, . . . ). The devices 100 as one or more nodes 36 are logically connected to the root node 34 hierarchically.

Figure 14:
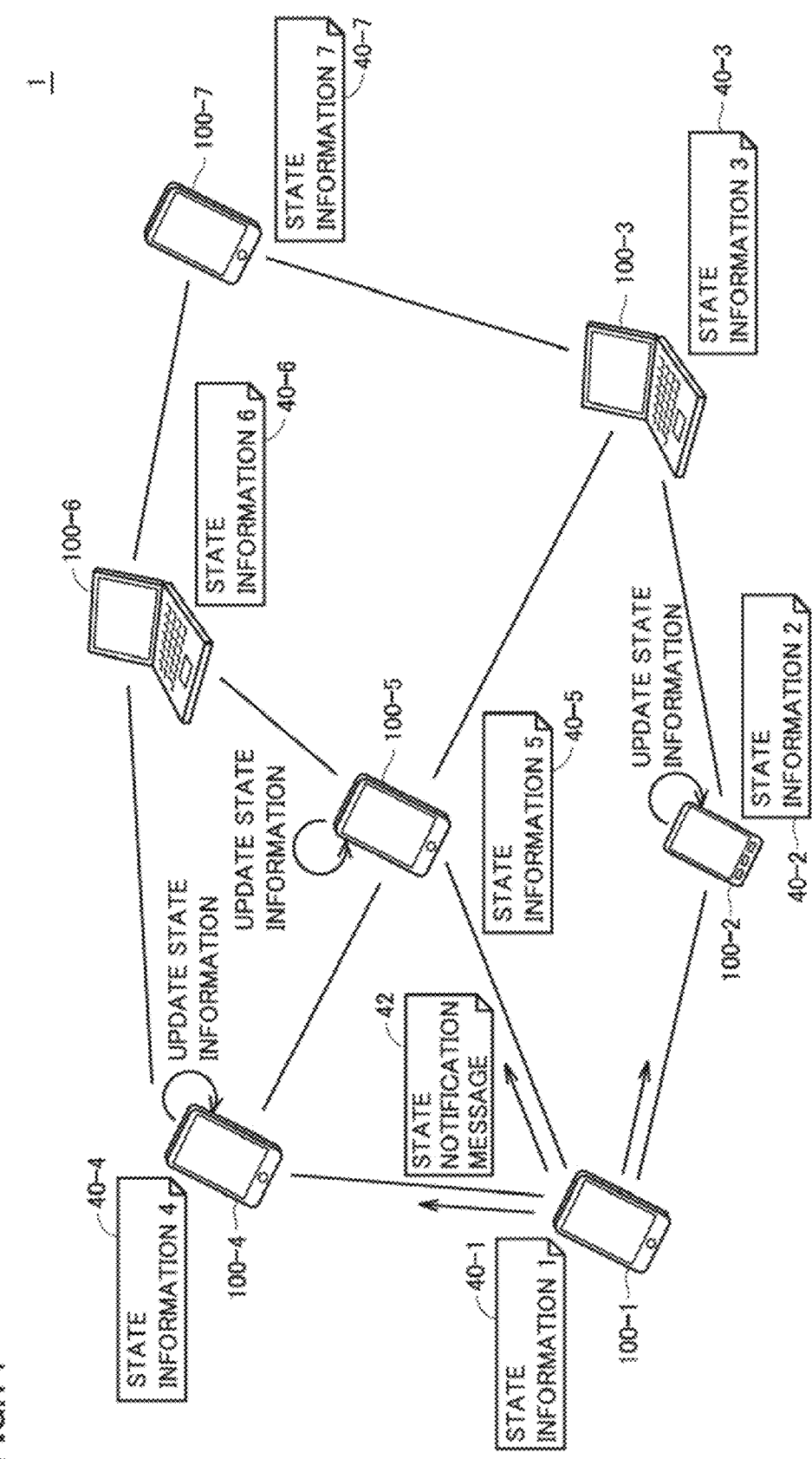
FIG. 14 is another diagram for describing a method of realizing the routing in the network system according to the present embodiment.

FIG. 14 is another diagram for describing a method of realizing the routing in the network system 1 according to the present embodiment.

Referring to FIG. 14, each device 100 included in the network system 1 has the state information 40 (state information 40-1, 40-2, 40-3, . . . ) reflecting the connection relationship (logical and physical connection relationship) between the devices 100. The state information 40 reflects the connection relationship between each device 100 and other devices.

In addition, each device 100 periodically (for example, every few minutes) transmits a state notification message 42 indicating the content of the held state information 40 to other devices 100 existing therearound. Each device 100 updates its own state information 40 as necessary based on the state notification message 42 from another device 100.

FIG. 14 shows an example in which the device 100-1 transmits the state notification message 42, but each device 100 included in the network system 1 transmits the state notification message 42. The tree structure shown in FIG. 13 is logically defined by updating the state information 40 based on the state notification message 42 from another device 100 by each device 100.

It is not necessary to determine in advance which device 100 will be the root node 34. In the state information 40 of each device 100, a value indicating a case where the device operates as the root node 34 is initially set. By updating the state information 40 based on the state notification message 42 from another device received thereafter, the device 100 to operate as the root node 34 and the device 100 to operate as the normal node 36 are autonomously determined.

Figure 15:
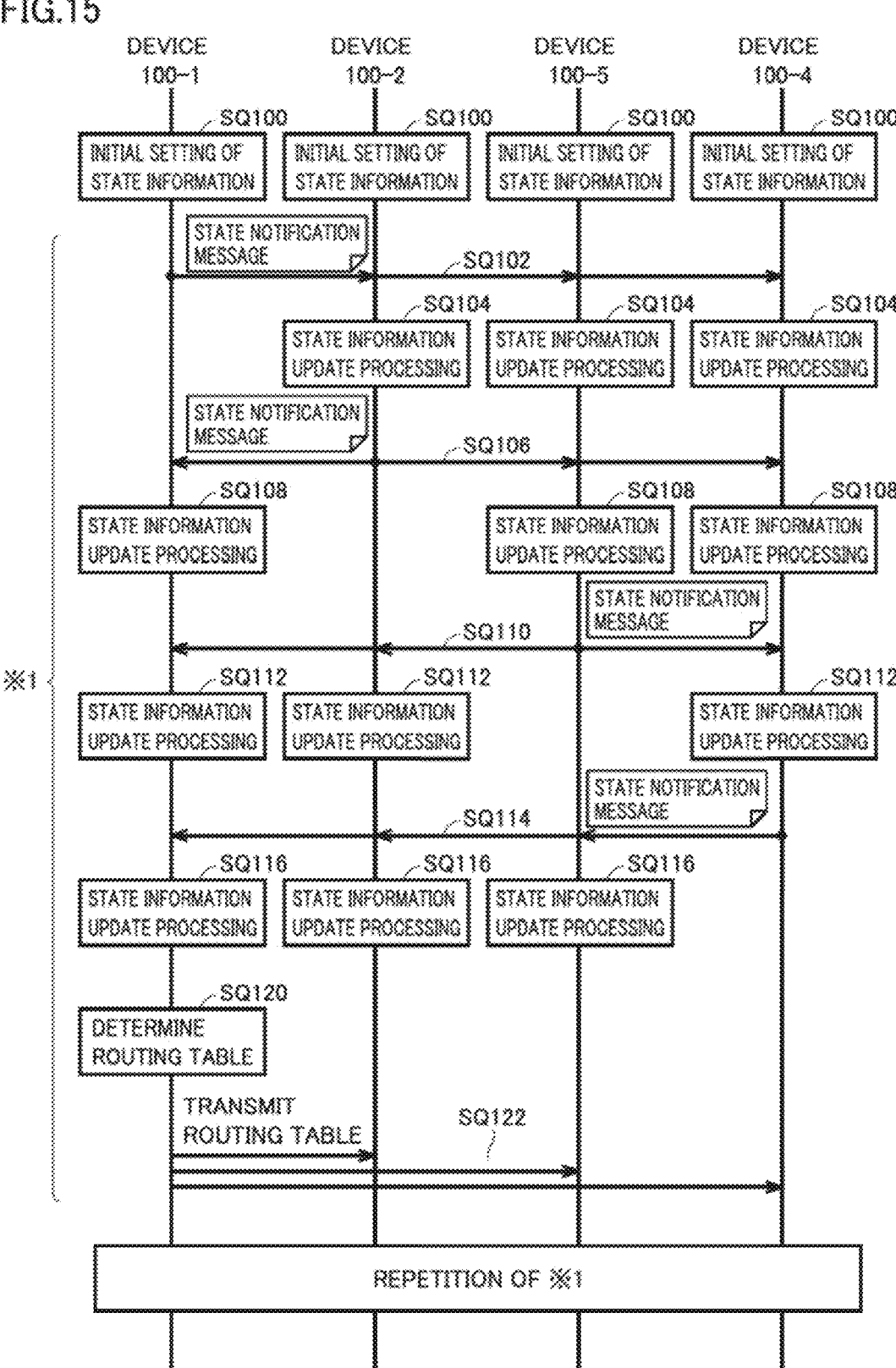
FIG. 15 is a sequence chart showing a processing procedure relevant to the realization of routing in the network system according to the present embodiment.

FIG. 15 is a sequence chart showing a processing procedure relevant to the realization of routing in the network system 1 according to the present embodiment. FIG. 15 shows the exchange focusing on the devices 100-1, 100-2, 100-5, and 100-4 shown in FIG. 14.

Referring to FIG. 15, when connected to the network system 1, first, each of the devices 100-1, 100-3, 100-5, and 100-4 initially sets its own state information 40 (sequence SQ100).

Then, the device 100-1 transmits the state notification message 42 indicating the content of its own state information 40 to the peripheral device 100 (sequence SQ102). Each device that has received the state notification message 42 from the device 100-1 executes update processing on its own state information 40 based on the received state notification message 42 (sequence SQ104).

Similarly, the device 100-2 transmits the state notification message 42 indicating the content of its own state information 40 to the peripheral device 100 (sequence SQ106). Each device that has received the state notification message 42 from the device 100-2 executes update processing on its own state information 40 based on the received state notification message 42 (sequence SQ108).

Similarly, the device 100-5 transmits the state notification message 42 indicating the content of its own state information 40 to the peripheral device 100 (sequence SQ110). Each device that has received the state notification message 42 from the device 100-5 executes update processing on its own state information 40 based on the received state notification message 42 (sequence SQ112).

Similarly, the device 100-4 transmits the state notification message 42 indicating the content of its own state information 40 to the peripheral device 100 (sequence SQ114). Each device that has received the state notification message 42 from the device 100-4 executes update processing on its own state information 40 based on the received state notification message 42 (sequence SQ116).

In this manner, each of the plurality of devices 100 holds the state information 40 reflecting the connection relationship between the respective devices 100 (sequence SQ100), and transmits the state notification message 42 indicating the content of the state information 40 to another device (sequences SQ102, SQ106, SQ110, and SQ114). In addition, each of the plurality of devices 100 updates the state information 40 held by each device 100 based on the state notification message 42 received from another device (sequences SQ104, SQ108, SQ112, and SQ116). These processes may be executed periodically.

In addition, the sequences SQ102 and SQ104, the sequences SQ106 and SQ108, the sequences SQ110 and SQ112, and the sequences SQ114 and SQ116 can be executed at timings independent of each other. Therefore, these sequences may be executed in any execution order, or may be executed in parallel.

When the device 100 operating as the root node 34 is determined as a result of the transmission of the state notification message 42 by each device 100, the device 100 operating as the root node 34 (device 100-1 in the example shown in FIG. 15) determines the routing table 32 (sequence SQ120). Thus, between the node groups 30 (groups of devices 100) logically defined based on the state information 40 held by each device 100, processing for determining the routing table 32 held between the devices 100 included in the node group 30 is executed. In addition, the routing table 32 is used to search for a device that is a destination for data transmission.

Then, the device 100 operating as the root node 34 transmits the determined routing table 32 to another device 100 operating as its own child node (sequence SQ122).

Then, the processes of the sequences SQ102 to SQ120 are repeated. For convenience of explanation, FIG. 15 shows an example in which each device 100 initially sets the state information 40. In practice, however, a case where any device 100 newly joins the network system 1 or any device 100 leaves the network system 1 is assumed. In such a case, processing such as changing the device 100 operating as the root node 34 or updating the content of the routing table 32 is executed.

Next, the details of the state information 40 and the state notification message 42 will be described. In the network system 1 according to the present embodiment, each device 100 sequentially updates its own state information 40 based on the state notification message 42 exchanged between the adjacent devices 100, thereby logically constructing the node group 30 in which the devices 100 are hierarchically connected to each other as shown in FIG. 13.

Figure 16:
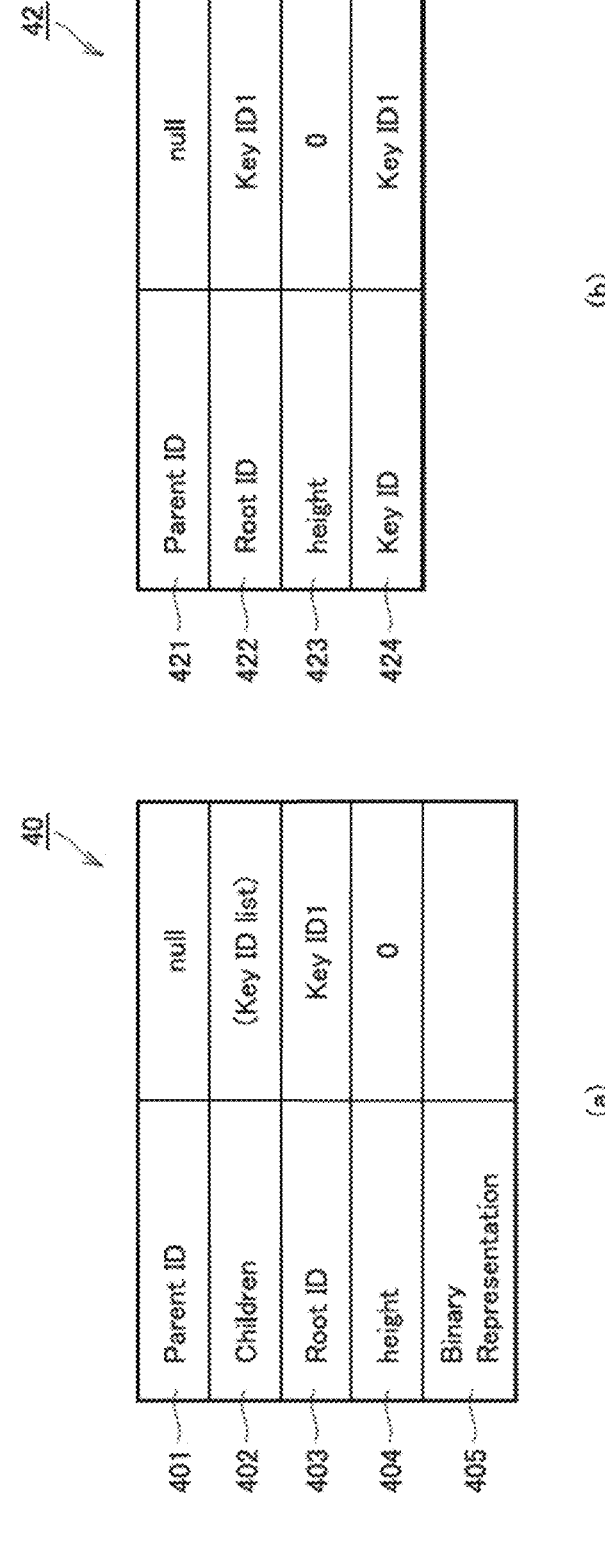
FIG. 16 is a diagram showing an example of the data structure of state information 40 and a state notification message used in the network system according to the present embodiment.

FIG. 16 is a diagram showing an example of the data structure of the state information 40 and the state notification message 42 used in the network system 1 according to the present embodiment. FIG. 16(a) shows an example of the data structure of the state information 40, and FIG. 16(b) shows an example of the data structure of the state notification message 42.

Referring to FIG. 16(a), the state information 40 includes a Parent ID 401, a Children 402, a Root ID 403, a height 404, and a binary representation 405 as setting items.

Identification information (typically, a Key ID, which will be described later) for identifying a device that is a parent node of each device 100 is stored in the Parent ID 401.

Identification information (typically, a Key ID, which will be described later) for identifying a device that is a child node of each device 100 is stored in the Children 402. In addition, since the number of devices that are child nodes is not limited to one, one or more devices are stored in the Children 402 in a list format.

Identification information (typically, a Key ID, which will be described later) for identifying the device 100 that operates as the root node 34 of the node group 30 to which each device belongs is stored in the Root ID 403.

The height of each device in the node group 30 to which each device belongs is stored in the height 404. The height means the maximum number of edges from the root node 34 to the leaf node in the node group 30 to which each device belongs. That is, the depth from the root node 34 to the leaf node in the node group 30 can be determined based on the magnitude of the height.

Identification information for identifying a device (node) to be searched for in the node group 30 to which each device belongs is stored in the binary representation 405.

In addition, the state information 40 may include a time stamp as a further setting item. The time stamp may be, for example, information indicating the update time of each device 100 or information indicating the time of the state notification message 42.

Each device 100 has identification information called a Key ID for identifying the device itself. As the Key ID, identification information by which the device 100 can be uniquely identified in the network system 1 is used. Typically, as the Key ID, the IP address of each device 100 or a hash value calculated from the IP address based on the hash function may be used.

Referring to FIG. 16(b), the state notification message 42 indicates the content of the state information 40. More specifically, the state notification message 42 includes a Parent ID 421, a Root ID 422, a height 423, and a Key ID 424.

The same value as the Parent ID 401 of the state information 40 is stored in the Parent ID 421. The same value as the Root ID 403 of the state information 40 is stored in the Root ID 422. The same value as the height 404 of the state information 40 is stored in the height 423. A Key ID that is identification information of the device itself is stored in the Key ID 424.

Thus, the state information 40 and the state notification message 42 include the Key ID (identification information of the device itself) as identification information for identifying each device 100. At this time, as the Key ID (identification information of the device itself), a value calculated based on the IP address determined by each device 100 may be adopted.

In addition, the state information 40 and the state notification message 42 include identification information (Key ID) for identifying the device 100 serving as the root node 34 of each device 100.

FIG. 16 shows a state in which both the state information 40 and the state notification message 42 are initially set. That is, "null" is set in the Parent ID 401, a value (Key ID1 in the example of FIG. 16) of the Key ID of the device itself is set in the Root ID 403, and "0" is set in the height 404

The state information 40 initially set as shown in FIG. 16(a) is appropriately updated based on the state information 40 from another device. Hereinafter, an example of updating the state information 40 will be described below.

Figure 17:
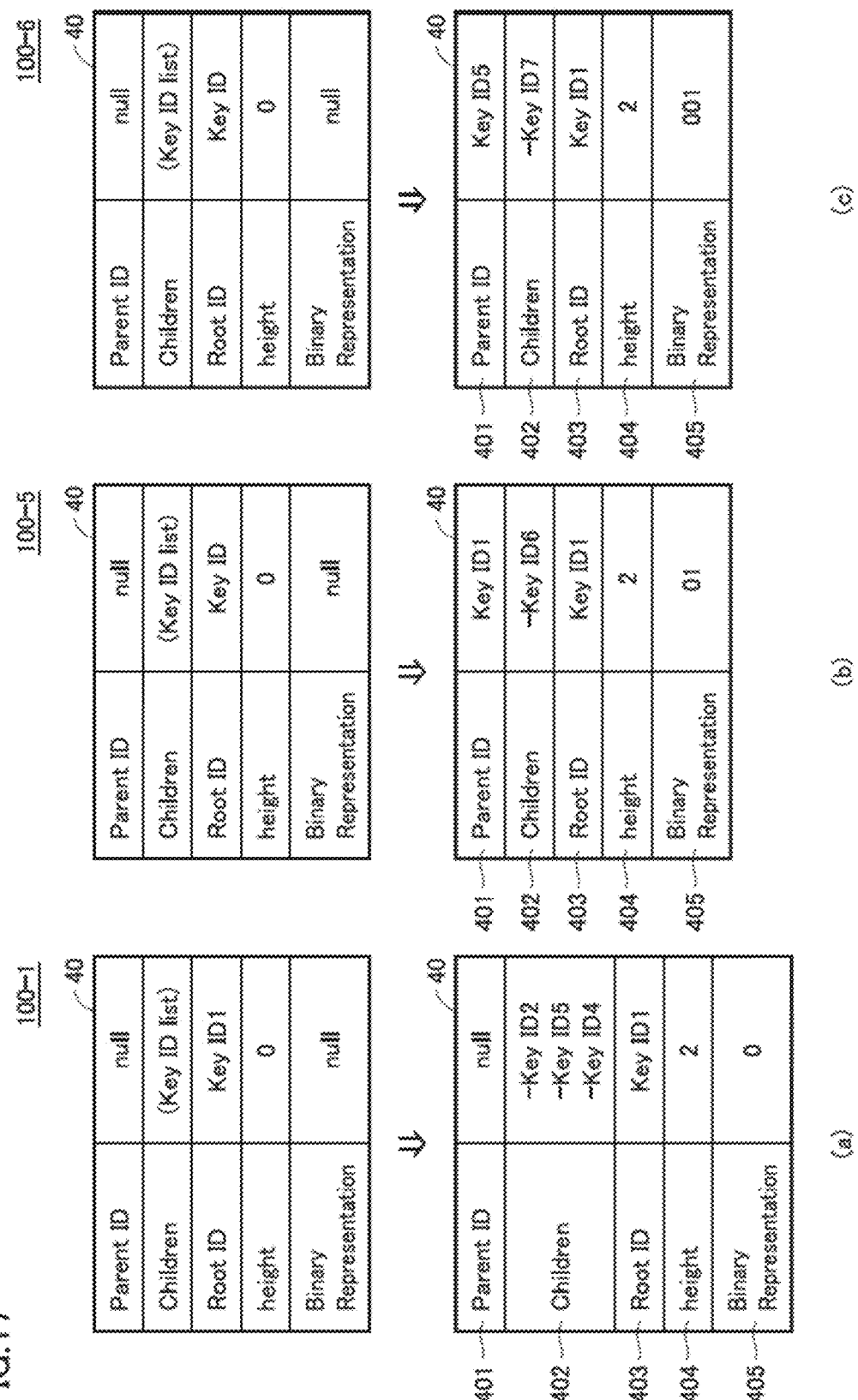
FIG. 17 is a diagram showing an example of updating state information according to a state notification message in the network system according to the present embodiment.

FIG. 17 is a diagram showing an example of updating the state information 40 according to the state notification message 42 in the network system 1 according to the present embodiment. FIG. 17 shows an example of updating the content of the state information 40 when the devices 100-1, 100-5, and 100-6 form a tree structure in this order in the network system 1 shown in FIG. 12.

The state information 40 of the devices 100-1, 100-5, and 100-6 is initially set and then sequentially updated based on the state notification message 42 from another device. As a result, in any of the state information 40, "Key ID1" indicating the device 100-1 is stored in the Root ID 403, and "2", which is the maximum number of edges from the root node 34 to the leaf node in the node group, is stored in the height 404.

The Key ID corresponding to the connection relationship between the nodes is stored in the Parent ID 401 and the Children 402 in each of the state information 40.

As an example, identification information of the number of bits according to the distance from the leaf node is stored in the binary representation 405. FIG. 17 shows three types of examples ("0", "01", "001") as an example. This may mean that, the larger the number of bits forming the value of the binary representation 405, the larger the distance from the leaf node. That is, this means that the device 100 having "0" as the binary representation 405 is closer to the corresponding leaf node and the device 100 having "001" as the binary representation 405 is farther from the corresponding leaf node.

The tree structure of the node group is specified based on the state information 40 of each device shown in FIG. 17, and the device 100 operating as the root node 34 determines the routing table 32 based on the specified tree structure and provides the routing table 32 to each device belonging to the same node group. By such a procedure, the determination of a node group and the root node 34 of the node group and the determination of the routing table 32 in the root node 34 can be realized.

In addition, since the transmission timing of the state notification message 42 from each device 100 is arbitrarily determined in each device 100, the update of the state information 40 is not always completed in all the devices. Therefore, it is preferable that each device 100 performs version management for several generations when updating the state information 40. That is, it is preferable to hold the content both before and after the update of the state information 40. In this case, the device 100 operating as the root node 34 determines the routing table 32 based on the appropriate version of the state information 40 among the pieces of state information 40 held by each device 100.

Figure 18:
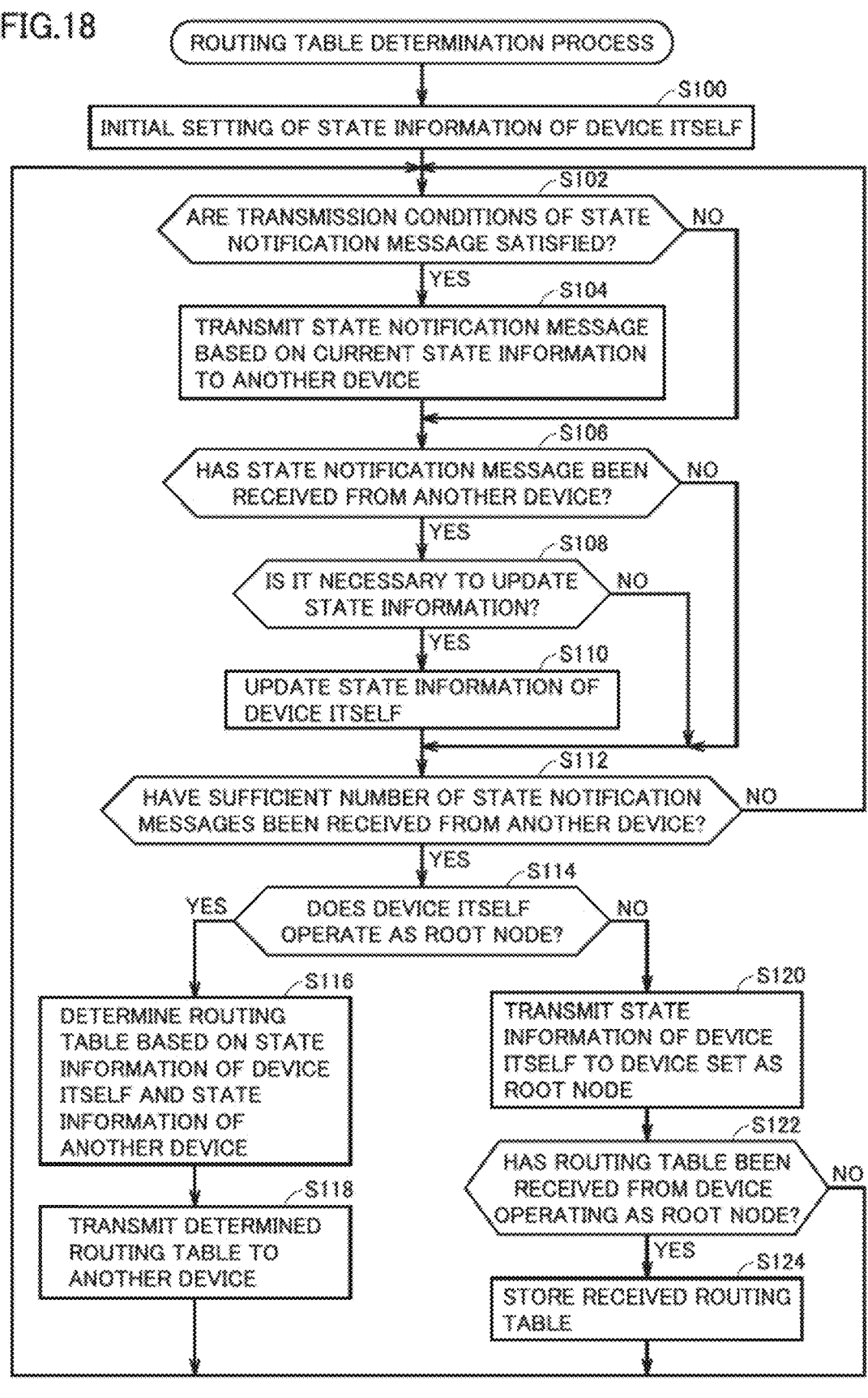
FIG. 18 is a flowchart showing a processing procedure relevant to the determination of a routing table in the network system according to the present embodiment.

FIG. 18 is a flowchart showing a processing procedure relevant to the determination of a routing table in the network system 1 according to the present embodiment. The process relevant to the determination of the routing table shown in FIG. 18 includes processing, such as determination of the node group 30 and update of the state information 40. Each step shown in FIG. 18 is executed by the control unit 110 (see FIG. 2) of the device 100 (typically realized by the cooperation of a processor and a memory).

Referring to FIG. 18, when connected to any network, the device 100 initially sets its own state information 40 (step S100).

Then, the device 100 determines whether or not the transmission conditions of the state notification message 42 are satisfied (step S102). For example, it is determined whether or not the elapsed time from the previous state notification message 42 has reached a predetermined time.

When the transmission conditions of the state notification message 42 are satisfied (YES in step S102), the device 100 generates the state notification message 42 based on the current state information 40 and transmits the state notification message 42 to another device (step S104). If the transmission conditions of the state notification message 42 are not satisfied (NO in step S102), the processing of step S104 is skipped.

Thus, the device 100 holds the state information 40 reflecting the connection relationship with another device, and executes a process of transmitting the state notification message 42 indicating the content of the state information 40 to another device (steps S100 to S104).

Then, the device 100 determines whether or not the state notification message 42 has been received from another device (step S106). If the state notification message 42 has been received from another device (YES in step S106), the device 100 determines whether or not the state information 40 needs to be updated based on the received state notification message 42 (step S108). If it is determined that the state information 40 needs to be updated (YES in step S108), the device 100 updates its own state information 40 (step S110). If it is determined that the state information 40 does not need to be updated (NO in step S108), the processing of step S110 is skipped.

Thus, the device 100 executes a process of updating the state information 40 based on the state notification message 42 received from another device 100 (steps S106 to S110).

On the other hand, if the state notification message 42 has not been received from another device (NO in step S106), the processing of steps S108 and S110 is skipped.

Here, the details of the processing of steps S108 and S110 will be described. The node group 30 shown in FIG. 13 can determine devices included in each tree structure by determining an arbitrary device as the root node 34. The device 100 operating as such a root node 34 may be determined based on the value of the Key ID of each device 100. That is, in the process of updating the state information 40, when a device (device 100 specified by the Key ID stored in the Root ID 422) serving as a root node included in the received state notification message 42 does not match a device (device 100 specified by the Key ID stored in the Root ID 403) serving as a root node included in the state information 40, a process of determining one of the devices 100 as a root node is executed according to a predetermined rule.

In the present embodiment, the magnitude relationship between Key IDs is used as an example of the predetermined rule. For example, a device having the smallest Key ID among the devices in a predetermined range may be determined as the root node 34 in the range. In this case, each device 100 determines whether or not the state information 40 needs to be updated by referring to the Root ID 422 (see FIG. 16(*b*)) included in the state notification message 42 received from another device corresponding to the parent node.

Specifically, when the following conditions (1) and (2) are satisfied, the content of the state information 40 is updated.

(1) Value of Root ID 403 of state information 40>Value of Root ID 422 of state notification message 42 received from parent node, and (2) Value of height 404 of state information 40<Value of height 423 of state notification message 42 received from parent node Here, the condition (1) means that the Key ID of the root node 34 recognized by the parent node is smaller than the Key ID of the root node 34 recognized by the device, and the condition (2) means that the parent node belongs to a tree structure deeper than the tree structure recognized by the device.

Then, when the conditions (1) and (2) are satisfied, the content of the state information 40 is updated so that the corresponding device is nested in the parent node. More specifically, as shown below, the Parent ID 401, the Root ID 403, and the height 404 of the state information 40 are updated to the values included in the state notification message 42 received from the parent node.

Parent ID 401 of state information 40←Value of Key ID 424 of state notification message 42 received from parent node Root ID 403 of state information 40←Value of Root ID 422 of state notification message 42 received from parent node height 404 of state information 40←value of height 423 of state notification message 42 received from parent node+1 (increment the value of height 423)

In addition, any rule for determining the root node 34 may be used, and a device having the largest Key ID among the devices in a predetermined range may be determined as the root node 34 in the range or a device whose Key ID is closest to an arbitrarily set value may be determined as the root node 34. In this case, the condition (1) described above may be changed as appropriate.

Then, the device 100 determines whether or not a sufficient number of state notification messages 42 have been received from another device (step S112). If a sufficient number of state notification messages 42 have been received from another device (YES in step S112), the device 100 executes, as follows, processing for holding the routing table 32 used to search for a device to be a destination of data transmission in the node group 30 (a group of logically defined devices 100) based on the state information 40 held by each device 100 (S116, S118, S122, and S124).

More specifically, the device 100 determines whether or not the device itself operates as the root node 34 based on the state information 40 (step S114).

When the device itself operates as the root node 34 (YES in step S114), the device 100 determines the routing table 32 based on the state information 40 of the device itself and the state information 40 of another device (step S116), and transmits the determined routing table 32 to another device (step S118).

In this manner, when it is determined based on the state information 40 that the device 100 itself operates as a root node in the node group 30, the device 100 executes processing for determining the routing table 32.

On the other hand, when the device 100 itself does not operate as the root node 34 (NO in step S114), the device 100 transmits the state information 40 of the device 100 itself to a device set as a root node (step S120), and determines whether or not the routing table 32 has been received from the device operating as a root node (step S122). If the routing table 32 is received from the device operating as a root node (YES in step S122), the device 100 stores the received routing table 32 (step S124). Thus, the device 100 holds the routing table 32 by receiving the routing table 32 from another device 100.

In addition, if the routing table 32 is not received from the device operating as a root node (NO in step S122), the processing of step S124 is skipped. In addition, if a sufficient number of state notification messages 42 are not received from another device (NO in step S112), the processing of step S102 and steps subsequent thereto is repeated.

Then, the processing of steps S102 to S124 shown in FIG. 18 is repeatedly executed.

FIG. 19 is a flowchart showing a processing procedure relevant to packet transmission and reception of each device 100 in the network system 1 according to the present embodiment. FIG. 19(*a*) shows a process when a packet to be transmitted is generated in a device itself, and FIG. 19B shows a process when a packet is received from another device. Each step shown in FIGS. 19(*a*) and 19(*b*) is executed by the control unit 110 (see FIG. 2) of the device 100 (typically realized by the cooperation of a processor and a memory).

Referring to FIG. 19(*a*), the device 100 determines whether or not a transmission packet addressed to another device has been given by the various applications 300 or the like (step S200). If a transmission packet addressed to another device has not been given (NO in step S200), the processing of step S200 is repeated.

On the other hand, if a transmission packet addressed to another device has been given (YES in step S200), the device 100 transmits the transmission packet to another device according to the route to the destination device by referring to the routing table 32 (step S202). At this time, if the destination device is included in the child node of the device itself, the device 100 transmits the transmission packet to the child node according to the route to the child node. On the other hand, if the destination device is not included in the child node of the device itself, the transmission packet is transmitted to the parent node of the device itself. As described above, the transmission packet transmission process ends.

Referring to FIG. 19(*b*), it is determined whether or not the transmission packet has been received from another device (step S250). If the transmission packet has not been received from another device (NO in step S250), the processing of step S250 is repeated.

On the other hand, if the transmission packet has been received from another device (YES in step S250), the device 100 determines whether or not the received transmission packet is addressed to the device itself (step S252). If the received transmission packet is addressed to the device itself (YES in step S252), the device 100 receives the transmission packet and outputs the transmission packet to the corresponding application 300 (step S254). Thus, the process when a packet is received ends.

On the other hand, if the received transmission packet is not addressed to the device itself (NO in step S252), the device 100 transmits the transmission packet to another device according to the route to the destination device by referring to the routing table 32 (step S256). The process of determining the destination with reference to the routing table 32 is the same as in step S202. Thus, the process when a packet is received ends.

As described above, in the network system 1 according to the present embodiment, the routing table 32 is determined and shared for each node group (each group of logically defined devices 100). By adopting the routing table 32 shared for each node group in this manner, when transmitting data to an arbitrary device included in the network system 1, the transmission route can be determined in a shorter time.

In the network system 1 according to the present embodiment, each of the devices 100 included in the network system 1 transmits the state notification message 42 indicating the content of the held state information 40 to another device 100. Then, when the state notification message 42 is received from another device 100, each of the devices 100 appropriately updates the content of the state information 40 held by the device itself based on the content of the received state notification message 42. By periodically or regularly executing such update processing on the state notification message 42 and the state information 40, even when the device 100 joins or leaves the network system 1 or the connection topology changes, the appropriate routing table 32 can be maintained.

E. Advantages

According to the network system 1 according to the present embodiment, it is possible to provide a solution through which each device can independently realize data communication in a network in which a large number of devices are present.

It should be considered that the embodiment disclosed is an example in all points and not restrictive. The scope of the present invention is defined by the claims rather than the above description, and is intended to include all modifications within the scope and meaning equivalent to the claims.

EXPLANATIONS OF LETTERS OR NUMERALS

1 Network System
2 Network
4 Access Point
6 Mobile Base Station
10 Connection 30 Node Group
32 Routing Table
34 Root Node
36 Node
40 State Information
42 State Notification Message
100 Device
102 Processor
104 Main Memory
106 Storage
108 Rom
110 Control Unit
120 Network Interface
130 Display Unit
140 Input Unit
150 Media Interface
152 Media
160 Os
170 Communication Processing Program
172 Private Key
174 Public Key
176 Digital Certificate
178 Hash Value
180 Hash Function
190 IP Address
194 Connection Table
200 Certificate Authority
210 Network Management Table
214 Initial Screen Information
216 Preference Information
220A, 220B Screen Example
230 Use Management Table
232 Network Address
234 Room Number
236 Available Time
240 Accommodation Facility
242 Wireless Communication Unit
300 Application
405 Binary Representation
RT1, RT2, RT3 Route

The invention claimed is:

1. A communication method in a network including a plurality of devices, the communication method comprising:
cryptographically determining, at each device of the plurality of devices, an entire network address of the device based on a public key of the device;
holding, at each device of at least some devices of the plurality of devices, a routing table for determining a destination to which data received by the device from another device is to be transmitted; and
updating, at each device of the at least some devices, upon receiving a notification message from another device, the routing table based on the received notification message indicating content of state information based on a connection relationship with the other device.

2. The communication method according to claim 1, wherein the routing table comprises:
identification information for identifying each device; and
a position of the device.

3. The communication method according to claim 1, wherein the notification message includes identification information for identifying a device having generated the state information indicated by the notification message, the identification information being calculated from a network address of the device.

4. The communication method according to claim 1, wherein the routing table is shared by devices belonging to a same node group among node groups into which the plurality of devices are logically divided.

5. The communication method according to claim 4, further comprising generating, at a device serving as a root node in the node group, the routing table.

6. The communication method according to claim 5, wherein the state information includes identification information for identifying the device serving as the root node.

7. The communication method according to claim 5, wherein the state information includes information indicating a depth from the root node to each device.

8. The communication method according to claim 5, wherein the state information includes:
identification information indicating a parent node of each device; and
identification information indicating a child node of each device.

9. A system comprising:
a network; and
a plurality of devices connected to the network,
each device of the plurality of devices being configured to perform operations comprising cryptographically determining an entire network address of the device based on a public key of the device, and
each device of at least some devices of the plurality of devices being configured to perform operations comprising:
holding a routing table for determining a destination to which data received by the device from another device is to be transmitted; and
updating, upon receiving a notification message from another device, the routing table based on the received notification message indicating content of state information based on a connection relationship with the other device.

10. The system according to claim 9, wherein the routing table includes:
identification information for identifying each device; and
a position of the device.

11. The system according to claim 9, wherein the notification message includes identification information for identifying a device having generated the state information indicated by the notification message, the identification information being calculated from a network address of the device.

12. The system according to claim 9, wherein the routing table is shared by devices belonging to a same node group among node groups into which the plurality of devices are logically divided.

13. The system according to claim 12, wherein a device serving as a root node in the node group of the plurality of devices is configured to perform operations comprising generating the routing table.

14. The system according to claim 13, wherein the state information includes identification information for identifying the device serving as the root node.

15. The system according to claim 13, wherein the state information includes information indicating a depth from the root node to each device.

16. The system according to claim 13, wherein the state information includes:

identification information indicating a parent node of each device; and identification information indicating a child node of each device.

\* \* \* \* \*